US012091914B2

(12) United States Patent
Campagna et al.

(10) Patent No.: US 12,091,914 B2
(45) Date of Patent: *Sep. 17, 2024

(54) MOTOR PRETENSIONED ROLLER SHADE

(71) Applicant: Crestron Electronics, Inc., Rockleigh, NJ (US)

(72) Inventors: Michael Campagna, Woodcliff Lake, NJ (US); Bruce Ryan Dahlgren, Buford, GA (US)

(73) Assignee: Crestron Electronics, Inc., Rockleigh, NJ (US)

( * ) Notice: Subject to any disclaimer, the term of this patent is extended or adjusted under 35 U.S.C. 154(b) by 712 days.

This patent is subject to a terminal disclaimer.

(21) Appl. No.: 17/319,041

(22) Filed: May 12, 2021

(65) Prior Publication Data

US 2021/0262286 A1 Aug. 26, 2021

Related U.S. Application Data

(63) Continuation-in-part of application No. 16/881,839, filed on May 22, 2020, which is a continuation-in-part (Continued)

(51) Int. Cl.

*E06B 9/62* (2006.01)
*E06B 9/44* (2006.01)

(Continued)

(52) U.S. Cl.

CPC .................. *E06B 9/72* (2013.01); *E06B 9/44* (2013.01); *E06B 9/60* (2013.01); *E06B 9/50* (2013.01); *E06B 2009/725* (2013.01)

(58) Field of Classification Search

CPC ........ E06B 2009/725; E06B 9/44; E06B 9/60; E06B 9/50; E06B 9/62

See application file for complete search history.

(56) References Cited

U.S. PATENT DOCUMENTS 8,368,328 B2 * 2/2013 Mullet .................... G08C 23/04 160/310
9,631,425 B2 * 4/2017 Campagna ................ E06B 9/72

(Continued)

FOREIGN PATENT DOCUMENTS

DE 202021102902 U1 * 7/2021

OTHER PUBLICATIONS

Machine translation DE202021102902 (Year: 2021).*

*Primary Examiner* — Abe Massad
*Assistant Examiner* — Jeremy C Ramsey
(74) *Attorney, Agent, or Firm* — Crestron Electronics, Inc.

(57) ABSTRACT

A roller shade comprising a motor pretensioned counterbalancing spring that lowers the torque load on the motor of the roller shade throughout the rolling up or rolling down cycles. The roller shade comprises a motor drive unit including a motor adapted to drive a drive wheel through a clutch. The motor drive unit further comprises a first spring carrier adapted to be stationary during operation of the motor and a second spring carrier adapted to rotate during operation of the motor. The motor drive unit further comprises a counterbalancing spring connected at its first end to the first spring carrier and at its second end to the second spring carrier. The counterbalancing spring is pretensioned using the motor prior to inserting the motor drive unit into the roller tube by driving the drive wheel and thereby rotating the second end of the counterbalancing spring with respect to the first end of the counterbalancing spring. The clutch translates rotational motion from the motor to the drive wheel, but locks rotational motion from the drive wheel thereby locking the pretension in the counterbalancing spring.

21 Claims, 13 Drawing Sheets

Related U.S. Application Data of application No. 16/855,694, filed on Apr. 22, 2020, now Pat. No. 11,613,926, which is a continuation-in-part of application No. 15/872,467, filed on Jan. 16, 2018, now Pat. No. 10,738,530.

(51) Int. Cl.

| | |
|---|---|
| ***E06B 9/60*** | (2006.01) |
| ***E06B 9/72*** | (2006.01) |
| *E06B 9/50* | (2006.01) |

(56) References Cited

U.S. PATENT DOCUMENTS

| | | | | |
|---|---|---|---|---|
| 9,834,986 | B2 * | 12/2017 | Bohlen | E06B 9/62 |
| 2010/0269988 | A1 * | 10/2010 | Mullet | E06B 9/72 160/310 |

* cited by examiner

MOTOR PRETENSIONED ROLLER SHADE

BACKGROUND OF THE INVENTION

Technical Field

Aspects of the embodiments generally relate to roller shades, and more particularly to systems, methods, and modes for a motor pretensioned roller shade.

Background Art

Motorized roller shades provide a convenient one-touch control solution for screening windows, doors, or the like, to achieve privacy and thermal effects. A motorized roller shade typically includes a rectangular shade material attached at one end to a cylindrical rotating tube, called a roller tube, and at an opposite end to a hem bar. The shade material is wrapped around the roller tube. An electric motor, either mounted inside the roller tube or externally coupled to the roller tube, rotates the roller tube to unravel the shade material to cover a window. To uncover the window, however, a lot of torque and motor power are required to initially lift the entire weight of the shade material and the hem bar. This is in particular detrimental to battery operated motors as rolling up the shade quickly drains the battery.

Various methods exist for counterbalancing roller shades using springs mounted inside the roller tubes in an effort to reduce torque requirements on shade motors. As the roller shade is unraveled, tension builds up in the spring. The tension is released when the roller shade is rolled up, thereby assisting the motor in lifting the shade material. One approach uses a conventional torsion spring comprising a plurality of coils. As a torsion spring is wound up, it builds up torque. When the torsion spring is let go, the amount of torque exerted by the torsion spring progressively reduces in a linear fashion as the torsion spring winds down. FIG. 1A shows a diagram 100 representing the performance of a conventional torsion spring in assisting rolling up an exemplary sized roller shade. Line 105 represents the torque profile necessary to roll up an exemplary sized roller shade from a rolled down position, when the shade material is fully unraveled, up to a rolled up position, when the shade material is fully wrapped about the roller tube. Initially, more torque is required to lift the entire weight of the fully unraveled shade material and the hem bar as represented by maximum torque ($T_{max}$) value 102. As the roller tube turns, the shade material wraps around the roller tube, resulting in less shade material hanging from the roller tube. Accordingly, as the roller tube keeps turning, less torque is required to lift the weight of the remaining shade material until a minimum torque ($T_{min}$) value 103 is reached. Line 106 represents the torque exerted by the torsion spring during the roller shade travel. As shown, the torsion spring torque 106 decreases at a slope in a linear fashion to a zero value as the torsion spring winds down.

Currently, a torsion spring is chosen with a torque 106 that approaches the $T_{max}$ value 102 required to lift the shade material and the hem bar. The resulting torque, shown by line 108 in the figure, required to be exerted by the motor to roll up the roller shade is equal to the difference between the torque of the roller shade 105 and the spring torque 106. FIG. 1B shows a diagram 101 representing the resulting power 110 required of the motor to roll up the shade. As the roller shade begins to roll up from a fully unrolled position, the torsion spring releases its built up torsion energy. Then its energy progressively diminishes as the roller shade continues to roll up. At the end of the rolling up cycle, the torsion spring unravels back to zero torsion assistance. Thus, a conventional torsion spring assists the motor significantly more when the roller shade begins to roll up than during the remainder of the rolling up cycle. In the example of FIGS. 1A and 1B, initially about 0.1 N m of torque and less than 1 W of power are required to lift up the roller shade. That number climbs up to above 0.8 N m of torque and above 6 W of power at the end of the roll up cycle. Thus, while the conventional torsion spring decreases the amount of torque required to roll up the roller shade in the beginning, the amount of torque and power required to finish rolling up the roller shade remains quiet high.

Counterbalancing systems exist that pretension the spring in the roller shade to further assist in rolling up the roller shade. One such system allows pretensioning the spring during the installation of the roller shade. However, field pretensioning is often done incorrectly, leaving the customer unsatisfied with the performance of the product. Therefore, it is desired to have a factory settable pretension of a spring. Other systems exist that allow factory settable pretensioning by providing means that temporary hold the pretension until the roller shade is installed. Thereafter, the pretension is held by the weight of the shade material. However, this preset pretension often dissipates during the continual operation of the shade, when the shade is knocked down or hit accidentally, or when the shade needs to be removed and reinstalled. Other systems required complex field adjustment and complicated motorized pretensioning.

Therefore, a need has arisen for systems, methods, and modes for counterbalancing a roller shade with a pretensioned spring and method for pretensioning the spring to lower the torque load on the motor of the roller shade throughout the rolling up or rolling down cycles of the roller shade. Additionally, a need has arisen for systems, methods, and modes for a motor pretensioned roller shade that can be pretensioned using the motor to a preset amount and which locks and maintains the pretension.

SUMMARY OF THE INVENTION

It is an object of the embodiments to substantially solve at least the problems and/or disadvantages discussed above, and to provide at least one or more of the advantages described below.

It is therefore a general aspect of the embodiments to provide systems, methods, and modes for counterbalancing a roller shade with pretensioned spring and method for pretensioning the spring to lower the torque load on the motor of the roller shade throughout the rolling up or rolling down cycles of the roller shade.

It is also an aspect of the embodiments to provide systems, methods, and modes for a motor pretensioned roller shade that can be pretensioned using the motor to a preset amount and which locks and maintains the pretension.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Further features and advantages of the aspects of the embodiments, as well as the structure and operation of the various embodiments, are described in detail below with reference to the accompanying drawings. It is noted that the aspects of the embodiments are not limited to the specific embodiments described herein. Such embodiments are presented herein for illustrative purposes only. Additional embodiments will be apparent to persons skilled in the relevant art(s) based on the teachings contained herein.

DISCLOSURE OF INVENTION

According to one aspect of the embodiments, a roller shade is provided comprising a roller tube, a shade material attached to the roller tube, and a motor drive unit at least partially disposed within the roller tube. The motor drive unit comprises a motor adapted to drive a motor output shaft, an output mandrel operably connected to the motor output shaft, a motor housing adapted to house the motor therein and comprising a first spring carrier adapted to be stationary during operation of the motor, a drive wheel operably connected to the output mandrel and the roller tube, a second spring carrier operably connected to the output mandrel, and a counterbalancing spring longitudinally extending from a first end connected to the first spring carrier to a second end connected to the second spring carrier. During operation of the motor, rotation of the motor output shaft causes rotation of the output mandrel and thereby the drive wheel, the second spring carrier, and the roller tube, and wherein as the motor output shaft rotates, the motor, the first spring carrier, and the motor housing remain stationary.

According to an embodiment, the counterbalancing spring is adapted to be pretensioned by the motor while the motor drive unit is located outside the roller tube. The counterbalancing spring may be adapted to be pretensioned by rotation of the motor output shaft, which causes rotation of the second spring carrier and thereby rotation of the second end of the counterbalancing spring in a first direction with respect to the first end of the counterbalancing spring and the first spring carrier. During operation of the roller shade, rotation of the motor output shaft to roll down the shade material causes further rotation of the second end of the counterbalancing spring in the first direction with respect to the first end of the counterbalancing spring, thereby further tensioning the counterbalancing spring. According to a further embodiment, during operation of the roller shade, rotation of the motor output shaft to roll up the shade material causes rotation of the second end of the counterbalancing spring in a second direction, opposite to the first direction, with respect to the first end of the spring, thereby releasing the tension in the counterbalancing spring. According to an embodiment, the counterbalancing spring is pretensioned by a predetermined number of pretension turns. The motor drive unit may further comprise a motor control module adapted to store the predetermined number of pretension turns in a memory. The motor control module may be adapted to enter into a pretensioning mode adapted to direct the motor to rotate the motor output shaft until the counterbalancing spring reaches the predetermined number of pretension turns. According to an embodiment, the predetermined number of pretension turns is determined based on at least one selected from the group consisting of a diameter or radius of the roller tube, a diameter or radius of the shade material wrapped about the roller tube, a thickness of the shade material, a width of the shade material, a length of the shade material, a number of layers of the shade material wrapped about the roller tube, a weight of the shade material, a weight of a hem bar attached to the shade material, and any combinations thereof.

According to an embodiment, counterbalancing spring may comprise a torsion spring. The motor housing may longitudinally extend from a first end to a second end, wherein the first end of the motor housing is rotatably connected to a crown adapter wheel and wherein the second end of the motor housing is rotatably connected to an idle crown wheel, wherein the crown adapter wheel and idle crown wheel are operably connected to the roller tube, wherein during operation of the roller shade as the motor output shaft rotates, the crown adapter wheel, the idle crown wheel, and the roller tube rotate about the motor housing. The motor drive unit may further comprises one or more planetary gears. The motor drive unit may further comprise a clutch comprising an input stage and an output stage, wherein the clutch is adapted to translate rotational motion from the input stage to the output stage and lock rotational motion from the output stage to the input stage, wherein the input stage is operably connected to the motor output shaft, and wherein the output stage is operably connected to the output mandrel. The counterbalancing spring may be adapted to be pretensioned by the motor while the motor drive unit is located outside the roller tube, and wherein the clutch is adapted to lock the pretension in the counterbalancing spring.

According to an embodiment, the output mandrel may extend from a first end located within the motor housing, out of an opening in the motor housing, and to a second end located outside the motor housing and connected to the drive wheel. The drive wheel may comprise the second spring carrier and wherein the drive wheel comprises a bore shaped to mate with an external surface of the output mandrel such that rotation of the output mandrel causes rotation of the drive wheel while allowing the drive wheel to longitudinally travel along the output mandrel. According to another embodiment, the second spring carrier comprises a bore shaped to mate with an external surface of the output mandrel such that rotation of the output mandrel causes rotation of the second spring carrier while allowing the second spring carrier to longitudinally travel along the output mandrel. The drive wheel may be connected to a terminal end of the output mandrel such that it does not longitudinally translate with respect to the output mandrel. According to an embodiment, the output mandrel may comprise a first mandrel portion and a second mandrel portion, wherein the first mandrel portion is operably connected to the motor output shaft and wherein the second mandrel portion is operably connected to the drive wheel.

According to another aspect of the embodiments, a roller shade is provided comprising a roller tube and a motor drive unit at least partially disposed within the roller tube. The motor drive unit comprises a motor adapted to drive a motor output shaft, a clutch operably connected to the motor output shaft, an output mandrel operably connected to the clutch, a motor housing adapted to house the motor therein and comprising a first spring carrier adapted to be stationary during operation of the motor, a drive wheel operably connected to the output mandrel and the roller tube, a second spring carrier operably connected to the output mandrel, and a pretensioned counterbalancing spring longitudinally extending from a first end connected to the first spring carrier and to a second end connected to the second spring carrier. During operation of the motor, rotation of the motor output shaft causes rotation of the output mandrel and thereby the drive wheel, the second spring carrier, and the roller tube, and wherein as the motor output shaft rotates, the motor, the first spring carrier, and the motor housing remain stationary. The counterbalancing spring is adapted to be pretensioned by the motor while the motor drive unit is located outside the roller tube by rotation of the motor output shaft, which causes rotation of the drive wheel and thereby rotation the second end of the counterbalancing spring with respect to the first end of the spring. The clutch is adapted to translate rotational motion from the motor output shaft to the drive wheel and lock rotational motion from the drive wheel thereby locking the pretension in the counterbalancing spring.

According to a further aspect of the embodiments, a motor drive unit is provided at least partially disposed within a roller tube of a roller shade. The motor drive unit comprises a motor adapted to drive a motor output shaft, a motor housing adapted to house the motor therein and comprising a first spring carrier adapted to be stationary during operation of the motor, a drive wheel operably connected to the motor output shaft and the roller tube, a second spring carrier operably connected to the motor output shaft, and a pretensioned counterbalancing spring longitudinally extending from a first end connected to the first spring carrier to a second end connected to the second spring carrier. During operation of the motor, rotation of the motor output shaft causes rotation of the second spring carrier, the drive wheel, and the roller tube, and as the motor output shaft rotates, the motor and the motor housing remain stationary. The counterbalancing spring is adapted to be pretensioned by the motor while the motor drive unit is located outside the roller tube by rotation of the drive wheel which causes rotation of the second end of the counterbalancing spring with respect to the first end of the counterbalancing spring.

According to yet another aspect of the embodiment, a roller shade is provided comprising a roller tube, a shade material attached to the roller tube, and a motor drive unit at least partially disposed within the roller tube. The motor drive unit comprises a motor adapted to drive a motor output shaft, an output mandrel operably connected to the motor output shaft, a motor housing adapted to house the motor therein, a stationary spring carrier, a drive wheel operably connected to the output mandrel and the roller tube, a rotating spring carrier operably connected to the output mandrel, and a counterbalancing spring longitudinally extending from a first end connected to the first spring carrier to a second end connected to the second spring carrier. During operation of the motor, rotation of the motor output shaft causes rotation of the output mandrel and thereby the drive wheel, the second spring carrier, and the roller tube, and wherein as the motor output shaft rotates, the motor, the first spring carrier, and the motor housing remain stationary.

BRIEF DESCRIPTION OF THE DRAWINGS

The above and other objects and features of the embodiments will become apparent and more readily appreciated from the following description of the embodiments with reference to the following figures. Different aspects of the embodiments are illustrated in reference figures of the drawings. It is intended that the embodiments and figures disclosed herein are to be considered to be illustrative rather than limiting. The components in the drawings are not necessarily drawn to scale, emphasis instead being placed upon clearly illustrating the principles of the aspects of the embodiments. In the drawings, like reference numerals designate corresponding parts throughout the several views.

BRIEF DESCRIPTION OF THE SEVERAL VIEWS OF THE DRAWING

Figure 1A:
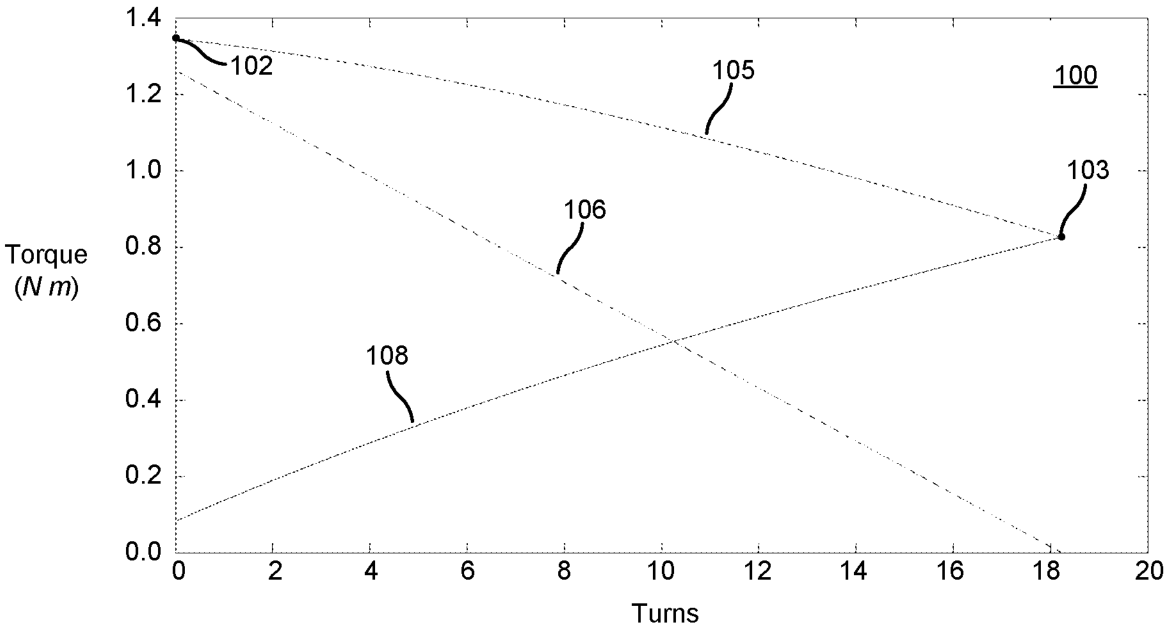
FIG. 1A (Prior Art)

FIG. 1A illustrates a torque diagram of a prior-art roller shade using a conventional torsion spring.

Figure 1B:
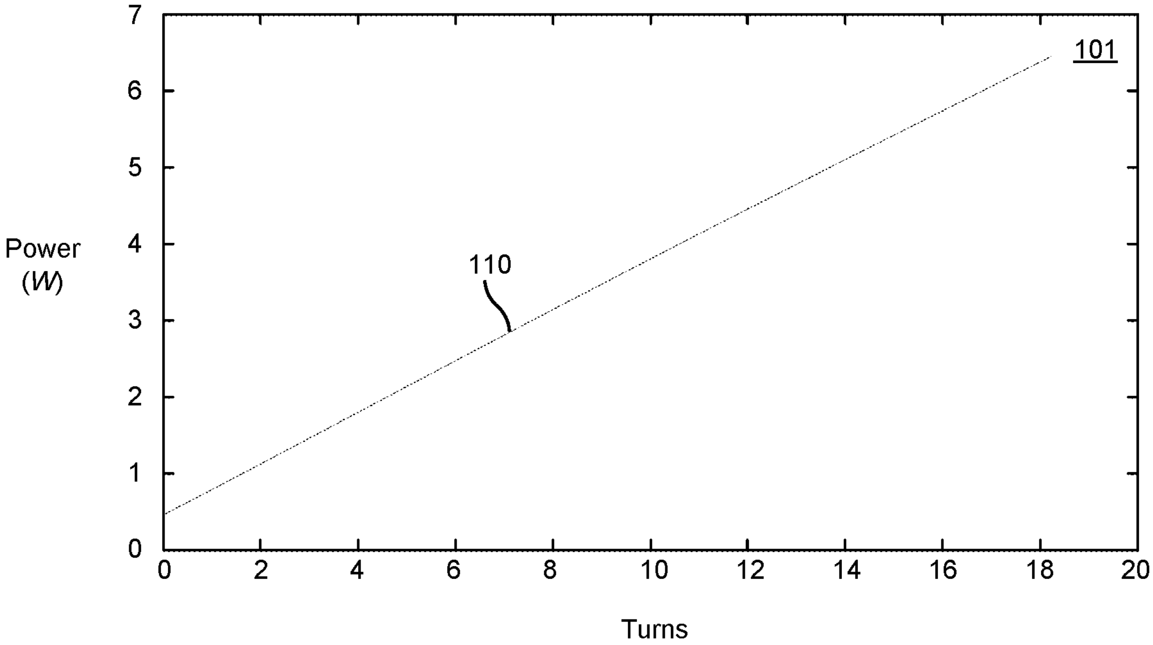
FIG. 1B (Prior Art)

FIG. 1B illustrates a power diagram of a motor required to lift the prior-art roller shade using the conventional torsion spring.

Figure 2A:
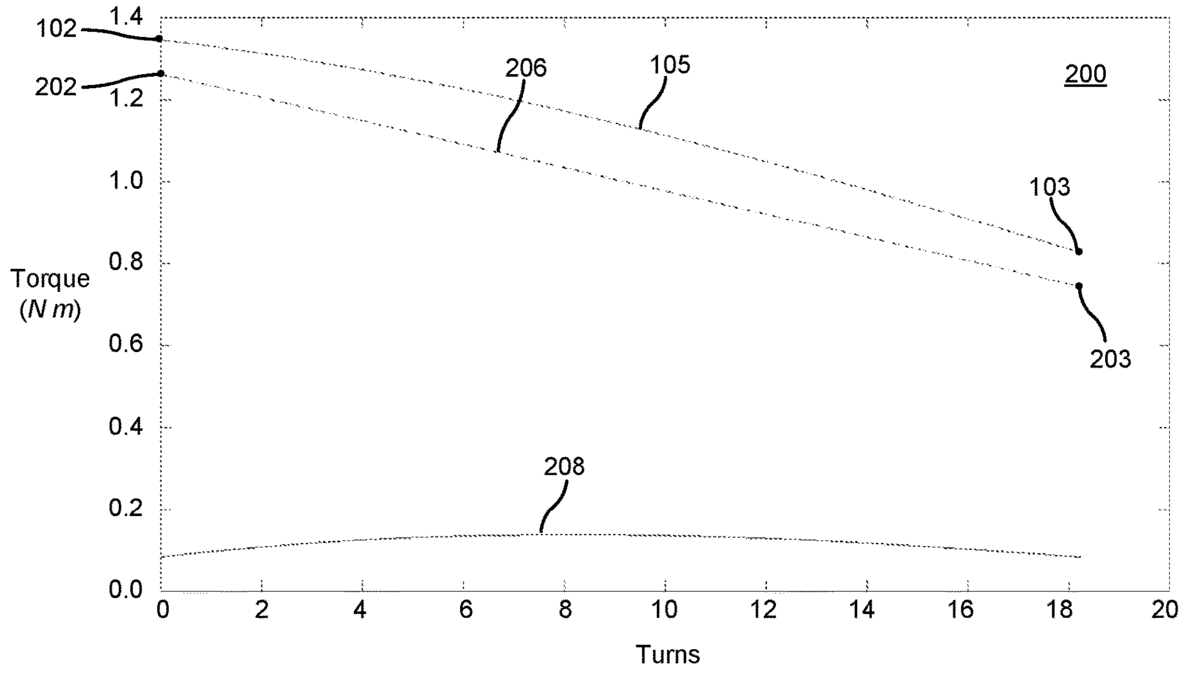

FIG. 2A illustrates a torque diagram of a roller shade using a pretensioned torsion spring according to one aspect of the embodiments.

Figure 2B:
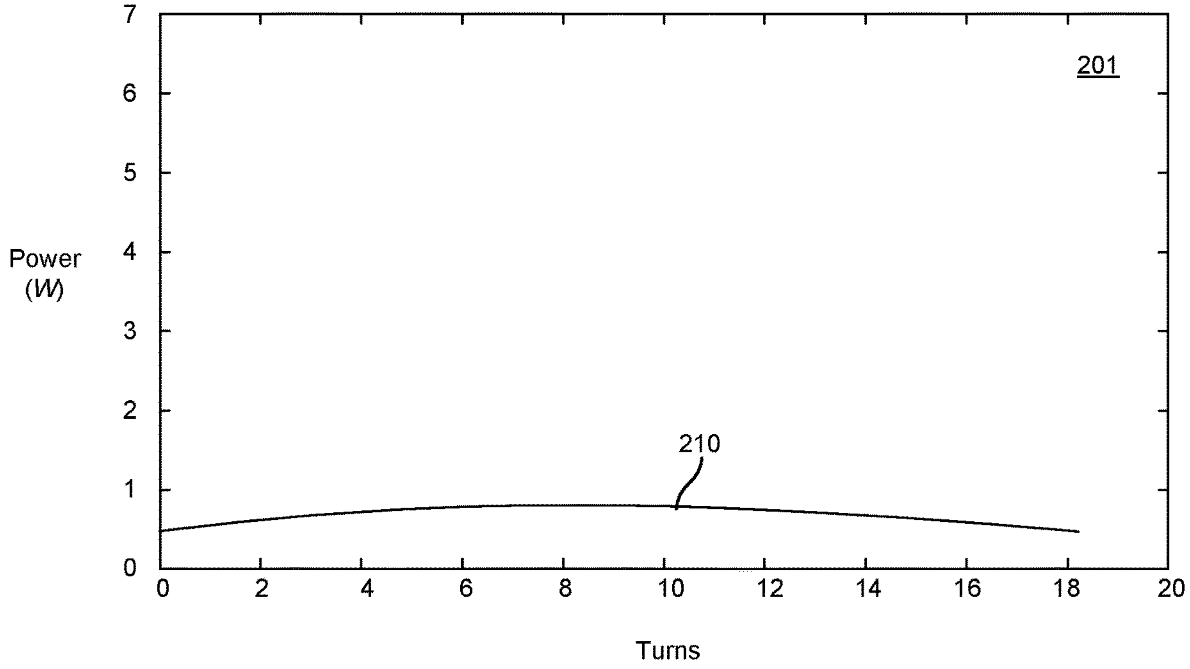

FIG. 2B illustrates a power diagram of a motor required to lift the roller shade using the pretensioned torsion spring according to one aspect of the embodiments.

Figure 3A:
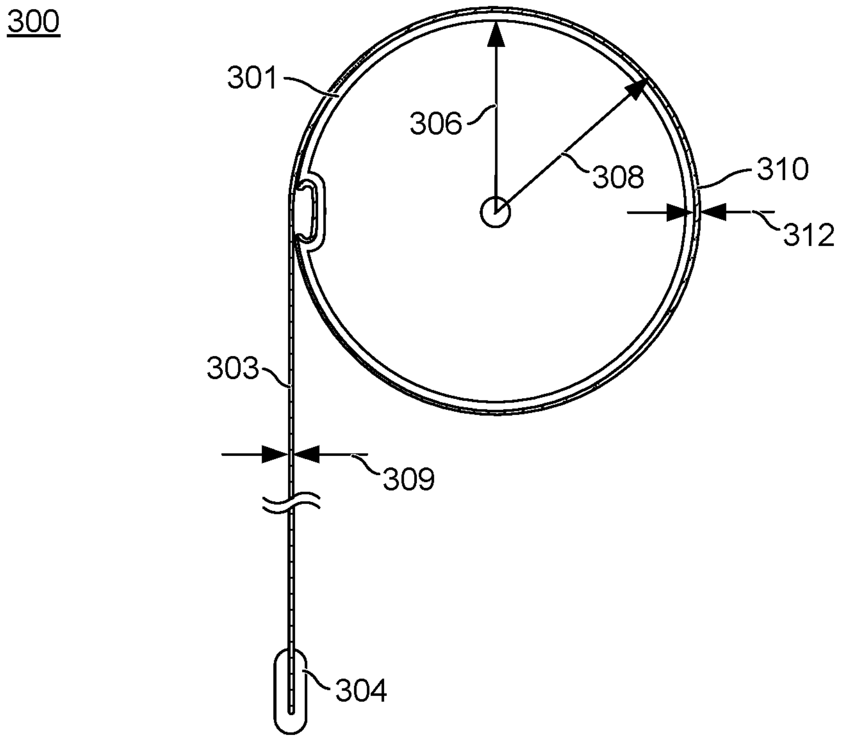

FIG. 3A illustrates an end view of a roller shade in a fully rolled down position according to one aspect of the embodiments.

Figure 3B:
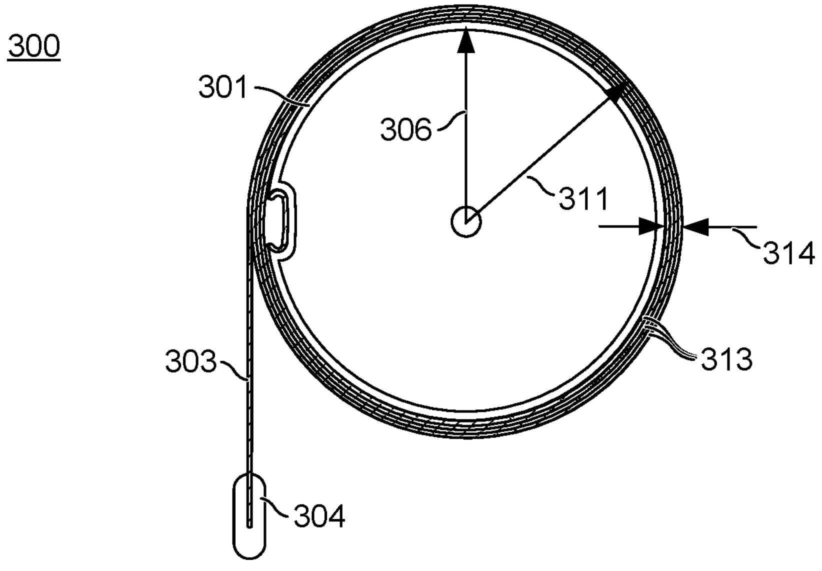

FIG. 3B illustrates an end view of the roller shade in a fully rolled up position according to one aspect of the embodiments.

Figure 4:
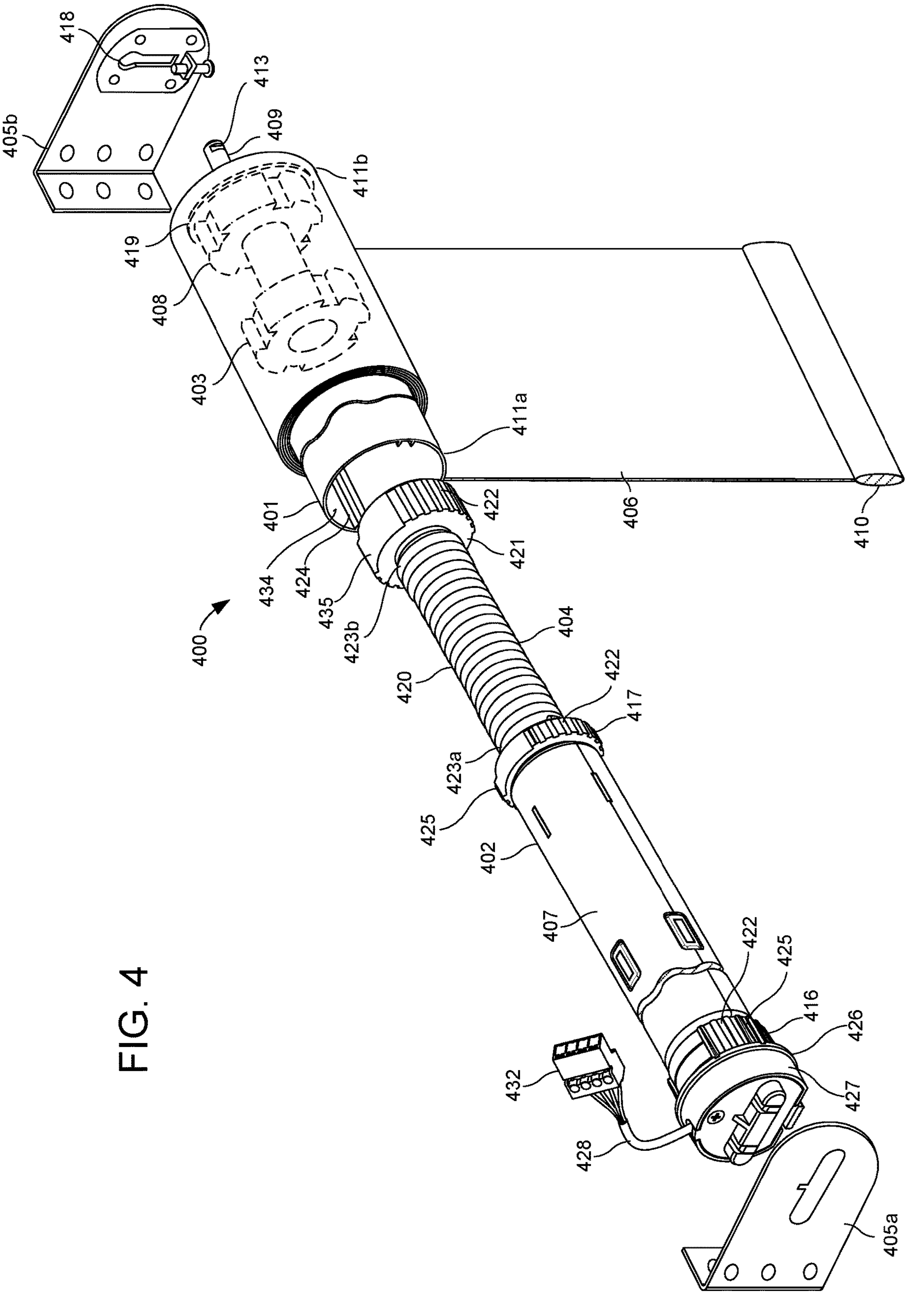

FIG. 4 illustrates a perspective view of a roller shade according to one aspect of the embodiments.

Figure 5:
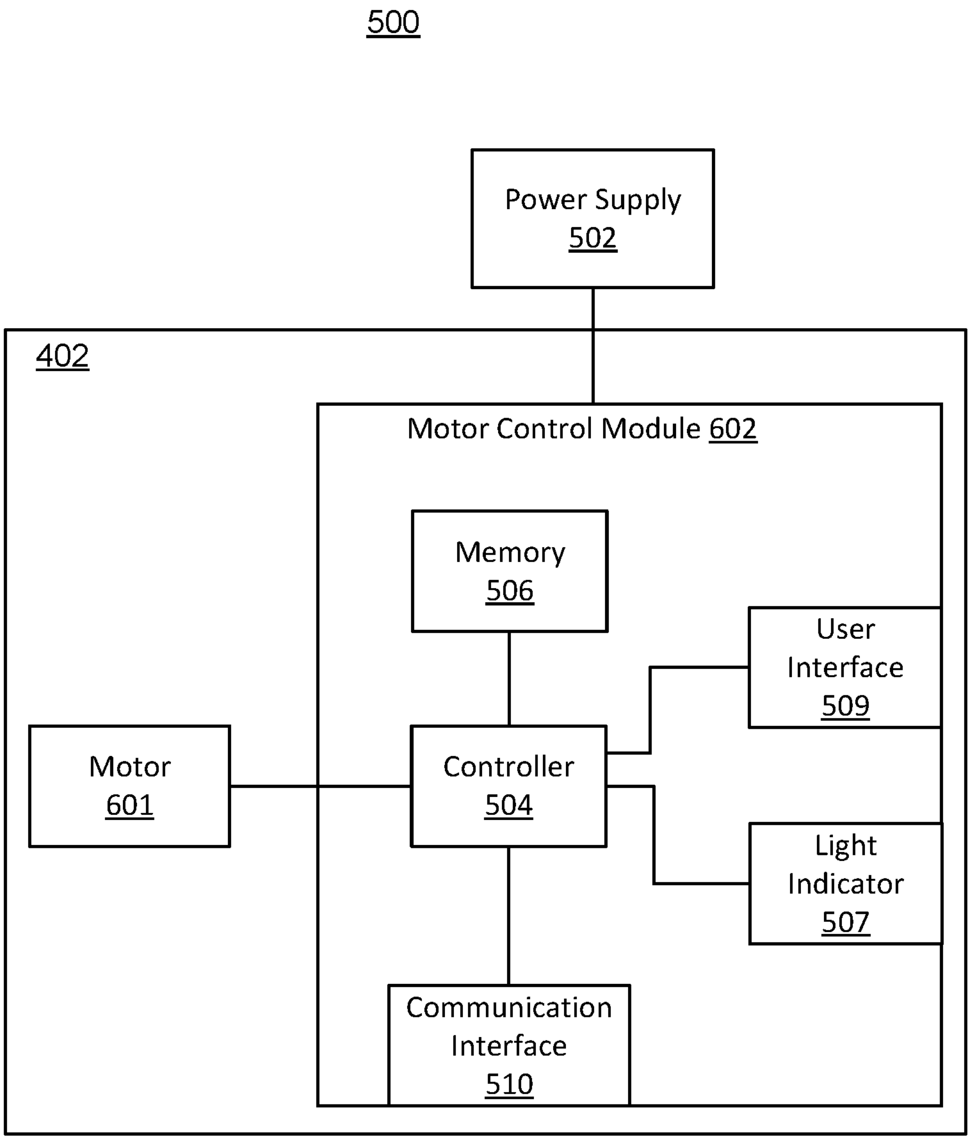

FIG. 5 shows an illustrative block diagram of a motor drive unit according to one aspect of the embodiments.

Figure 6:
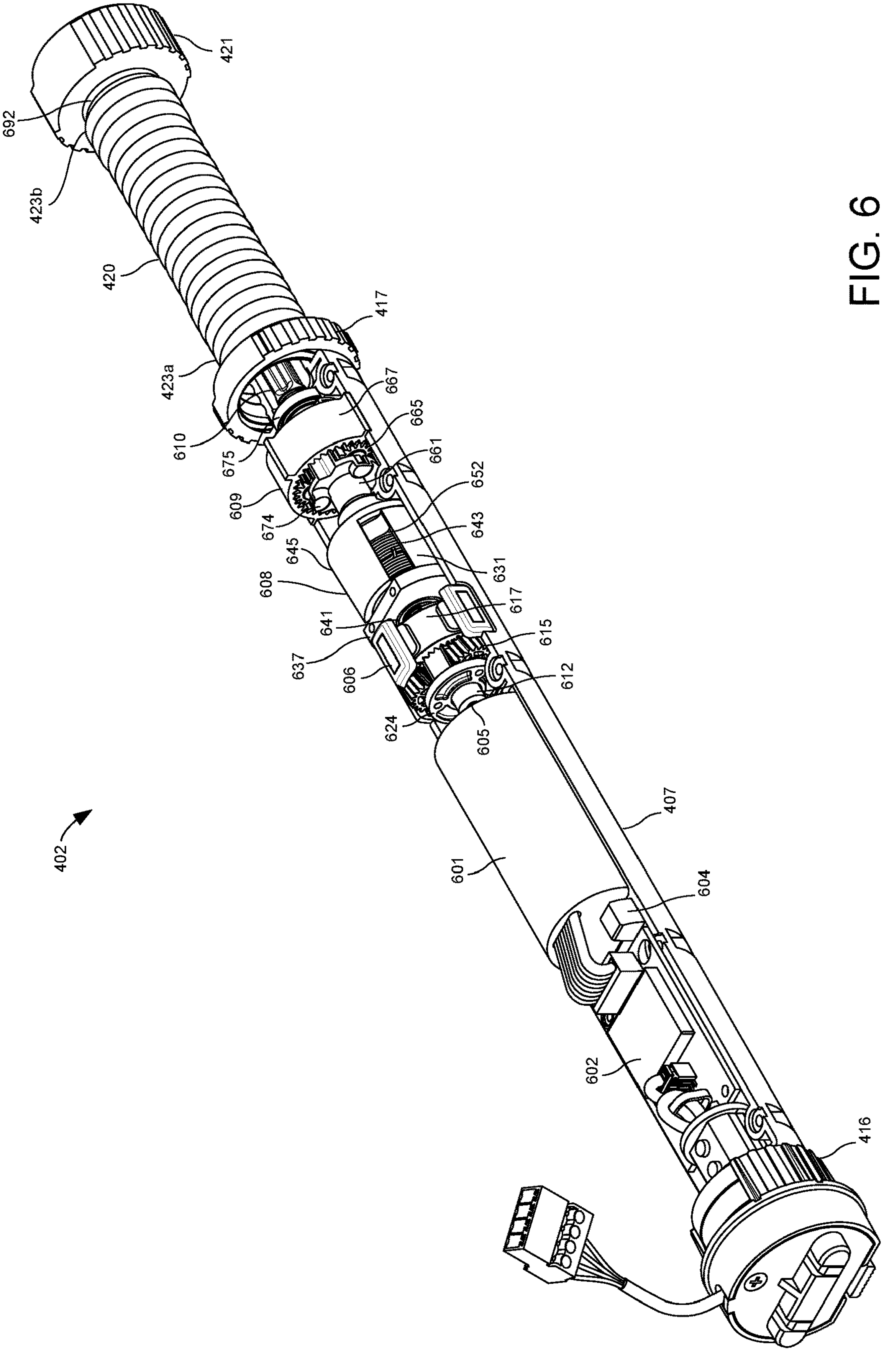

FIG. 6 shows a first side perspective view of the motor drive unit according to one aspect of the embodiments.

Figure 7:
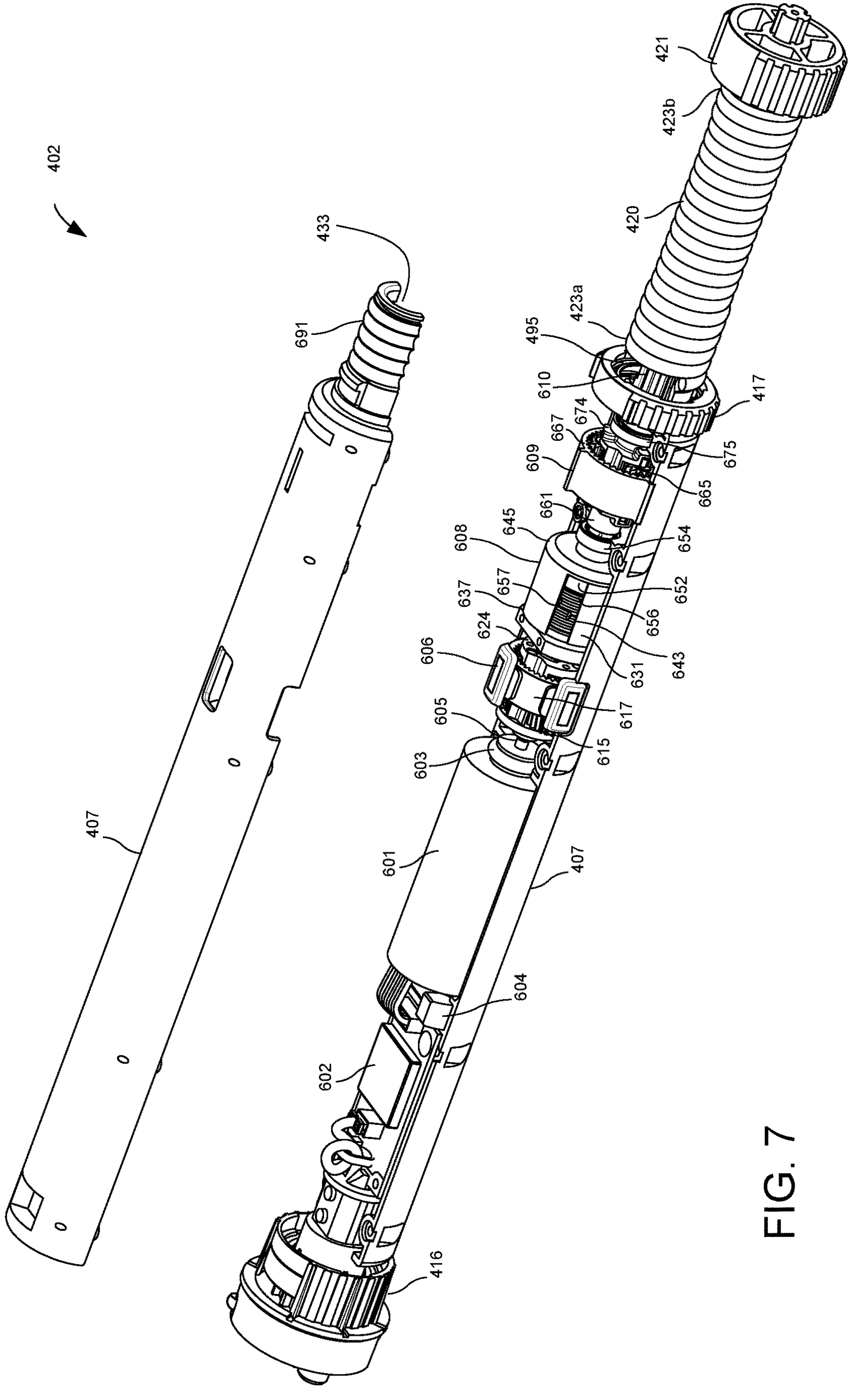

FIG. 7 shows a second side perspective view of the motor drive unit according to one aspect of the embodiments.

Figure 8:
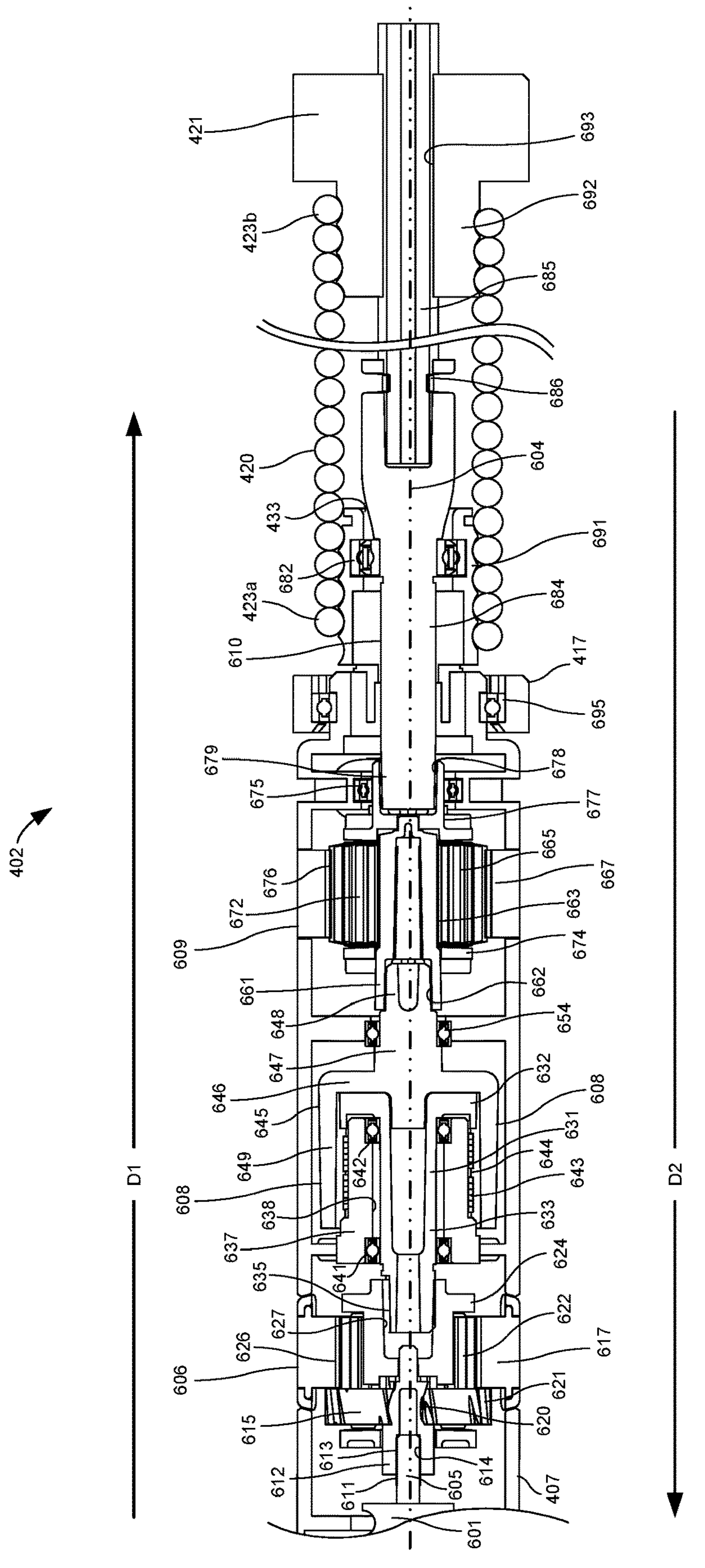

FIG. 8 shows a cross-sectional view of the motor drive unit according to one aspect of the embodiments.

Figure 9:
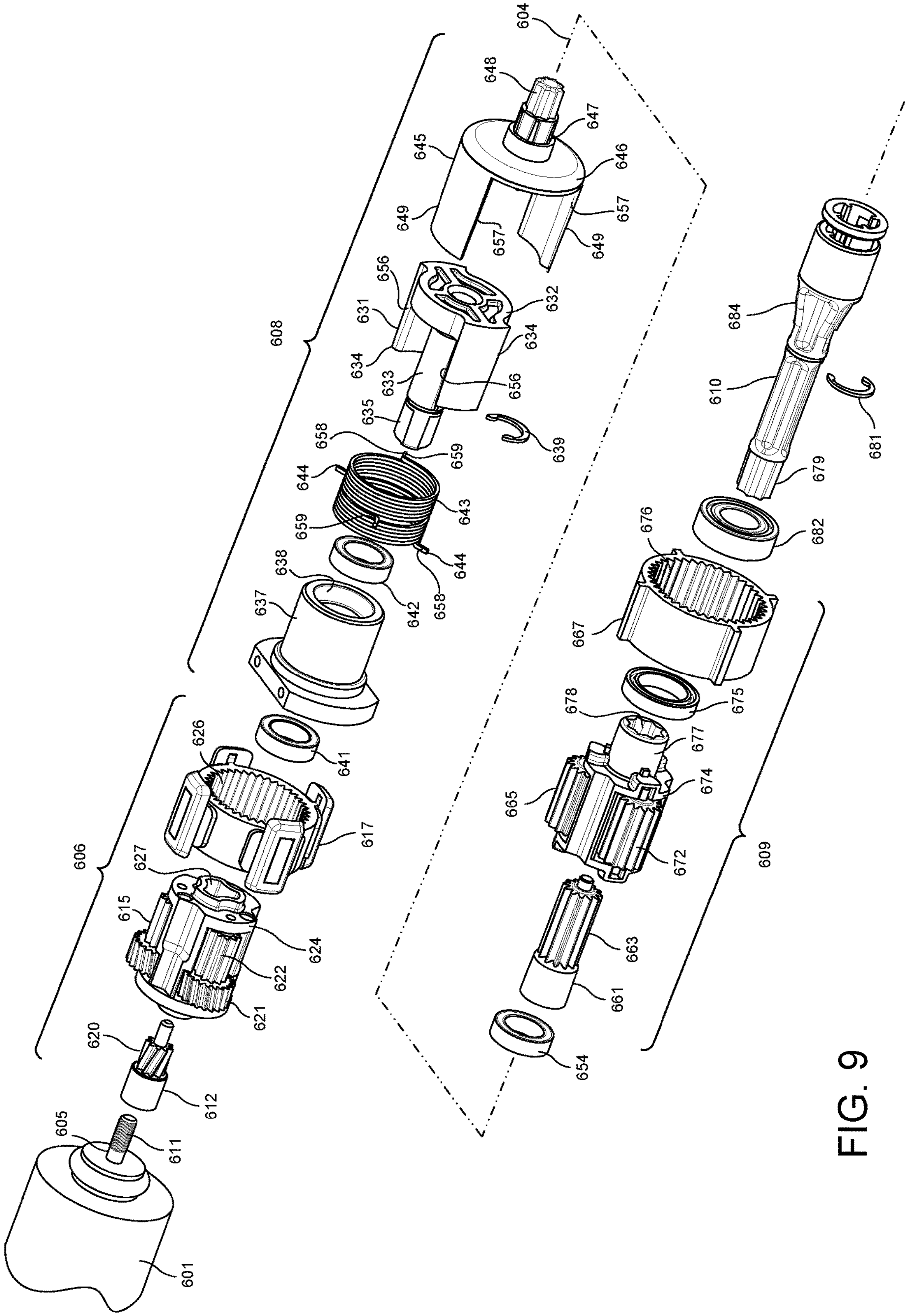

FIG. 9 shows an exploded perspective view of a drive assembly portion of the motor drive unit according to one aspect of the embodiments.

Figure 10:
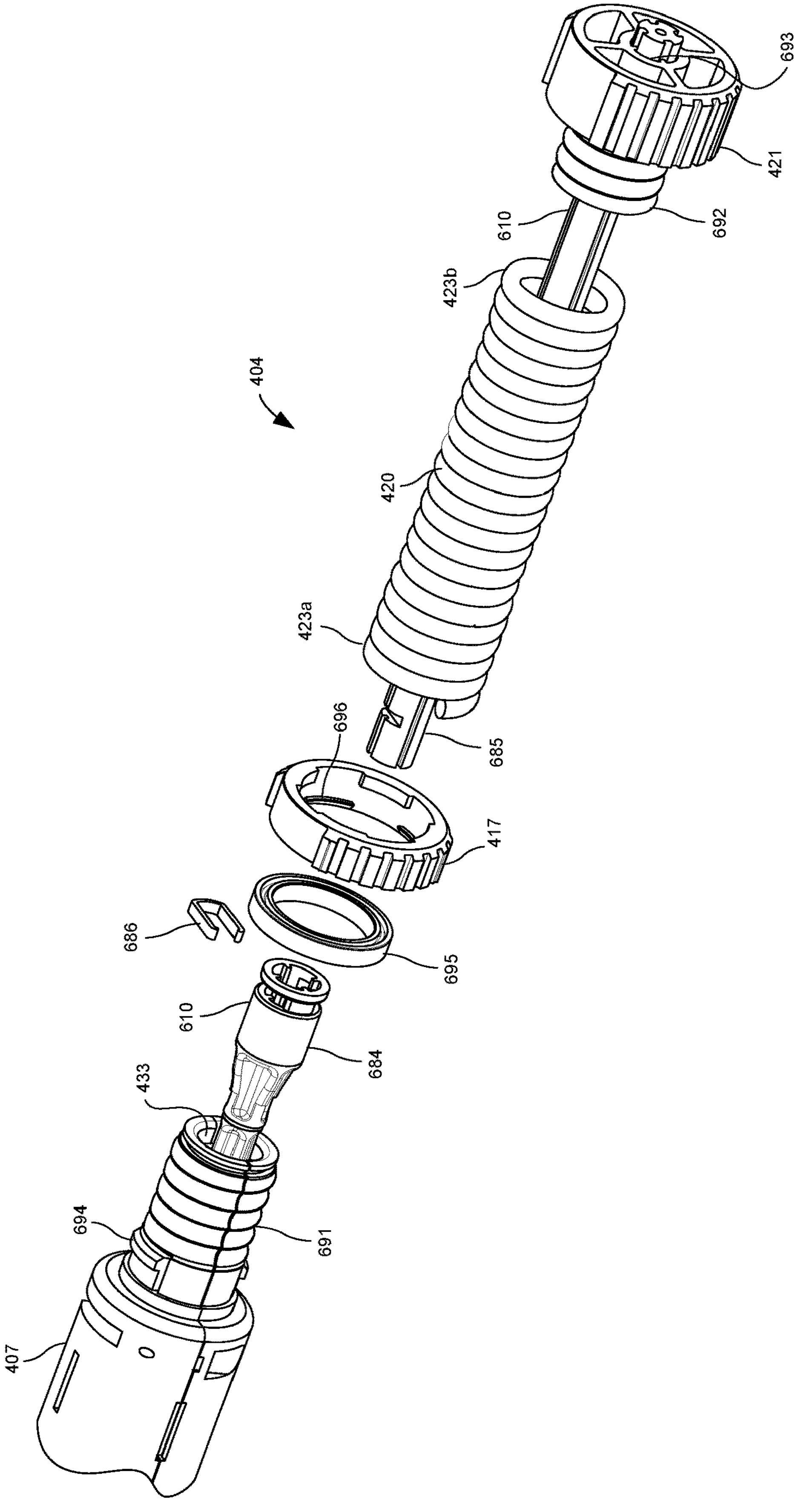

FIG. 10 shows an exploded perspective view of a counterbalancing assembly portion of the motor drive unit according to one aspect of the embodiments.

Figure 11:
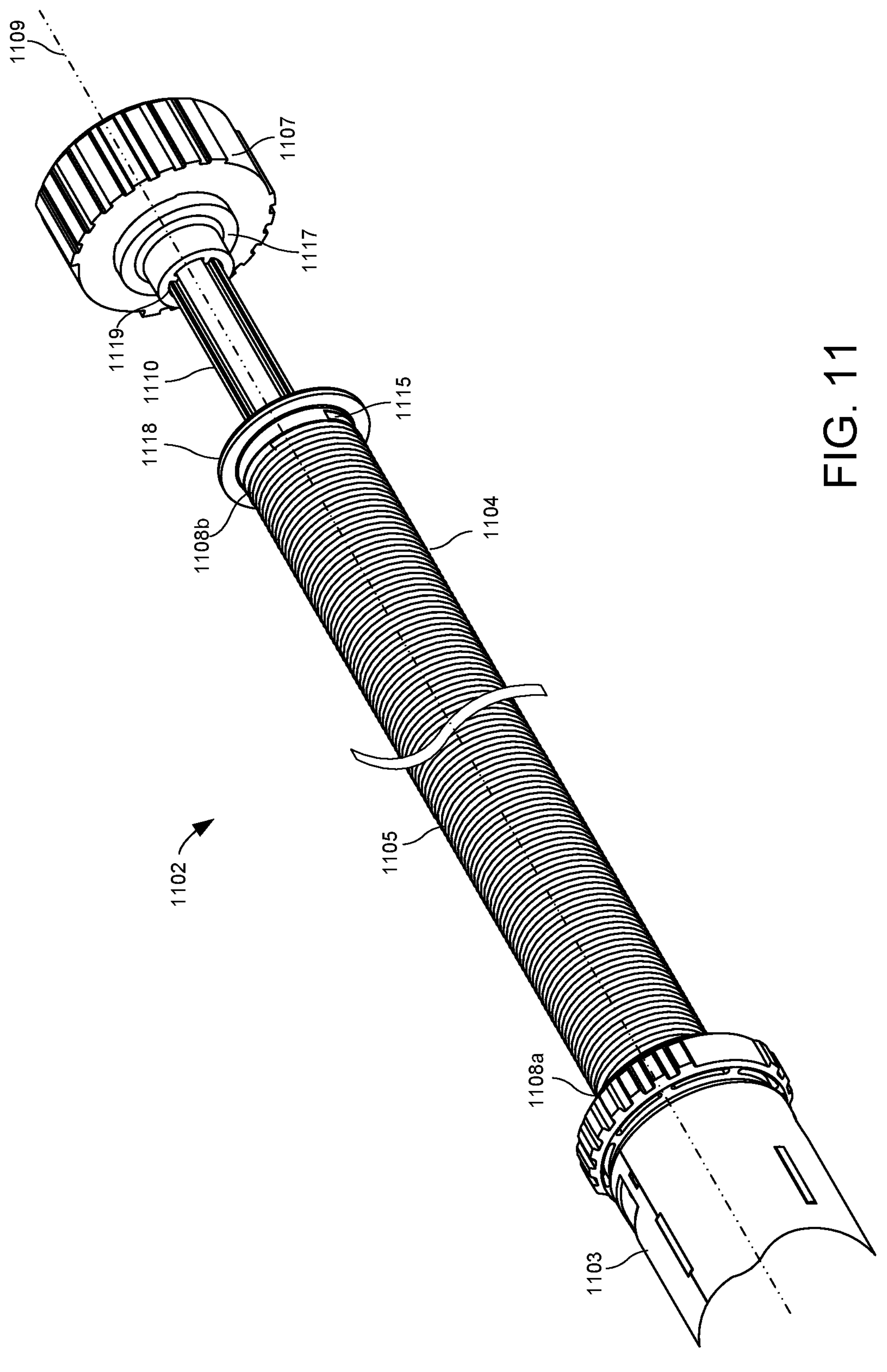

FIG. 11 shows a perspective view of a counterbalancing assembly portion of the motor drive unit according to another aspect of the embodiments.

Figure 12:
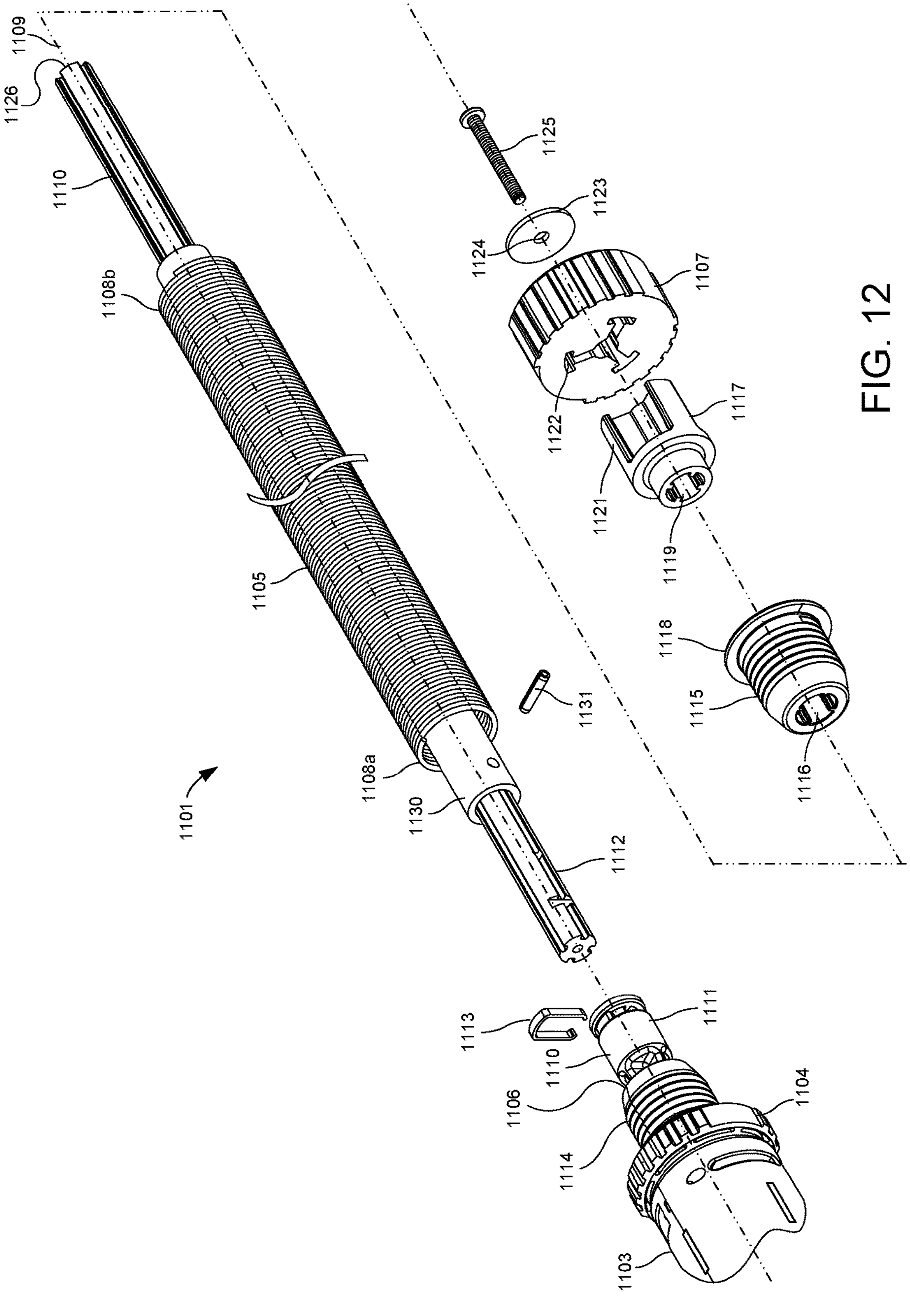

FIG. 12 shows an exploded perspective view of the counterbalancing assembly portion of the motor drive unit according to another aspect of the embodiments.

Figure 13:
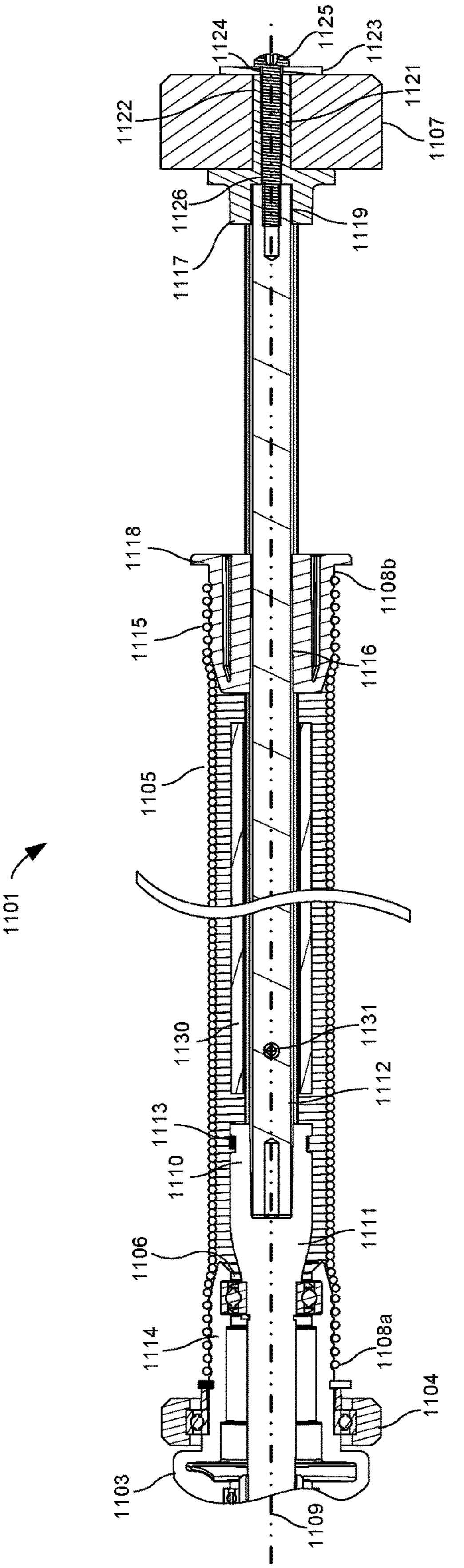

FIG. 13 shows a cross-sectional view of the counterbalancing assembly portion of the motor drive unit according to another aspect of the embodiments.

DETAILED DESCRIPTION OF THE INVENTION

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" or "in an embodiment" in various places throughout the specification is not necessarily referring to the same embodiment. Further, the particular features, structures, or characteristics may be combined in any suitable manner in one or more embodiments.

LIST OF REFERENCE NUMBERS FOR THE ELEMENTS IN THE DRAWINGS IN NUMERICAL ORDER

The following is a list of the major elements in the drawings in numerical order.

- 100 Torque Diagram of a Roller Shade Using a Conventional Torsion Spring
- 101 Power Diagram of a Motor
- 102 Maximum Torque
- 103 Minimum Torque
- 105 Torque Profile of a Roller Shade
- 106 Torque of a Conventional Torsion Spring
- 108 Torque of a Motor
- 110 Power of a Motor
- 200 Torque Diagram of a Roller Shade Using a Pretensioned Torsion Spring
- 202 Maximum Torque
- 203 Minimum Torque
- 206 Torque Profile of Roller Shade's Spring
- 208 Torque of a Motor
- 210 Power of a Motor
- 300 Roller Shade
- 301 Roller Tube
- 303 Shade Material
- 304 Hem Bar
- 306 Radius of the Roller Tube
- 308 Radius of the Roller Tube plus the Thickness of the Shade Material Layers Wrapped on the Roller Tube (if any) when the Shade Material is at the Rolled Down Position
- 309 Thickness of the Shade Material (Single Layer)
- 310 Overwrap
- 311 Radius of the Shade Material Wrapped on the Roller Tube plus the Thickness of the Shade Material Layers Wrapped over the Roller Tube when the Shade Material is at the Rolled Up Position
- 312 Thickness of the Shade Material Layers over the Roller Tube
- 313 Shade Material Layers
- 314 Thickness of the Shade Material Layers over the Roller Tube
- 400 Roller Shade
- 401 Roller Tube
- 402 Motor drive unit
- 403 Idler Assembly
- 404 Counterbalancing Assembly
- 405*a* Mounting Bracket
- 405*b* Mounting Bracket
- 406 Shade Material
- 407 Motor Housing
- 408 Idler Body
- 409 Idler Pin
- 410 Hem Bar
- 411*a* First End of Roller Tube
- 411*b* Second End of Roller Tube
- 413 Pin Tip
- 416 Crown Adapter Wheel
- 417 Idler Crown Wheel
- 418 Keyhole
- 419 Flange
- 420 Counterbalancing Spring
- 421 Drive Wheel
- 422 Channels
- 423*a* First End of Counterbalancing Spring
- 423*b* Second End of Counterbalancing Spring
- 424 Projections
- 425 Teeth
- 426 Flange
- 427 Motor Head
- 428 Power Cord
- 432 Terminal Block
- 434 Inner Surface
- 500 Block Diagram of the Motor drive unit
- 502 Power Supply
- 504 Controller
- 506 Memory
- 507 Light Indicator
- 509 User Interface
- 510 Communication Interface
- 601 Motor
- 602 Motor Control Module
- 603 O-Ring
- 604 Center Axis of Rotation
- 605 Motor Output Shaft
- 606 First Stage Planetary Gear
- 608 Clutch
- 609 Final Stage Planetary Gear
- 610 Output Mandrel
- 611 Output Shaft Teeth
- 612 Sun Gear
- 613 Sun Gear Teeth
- 614 Bore
- 615 Planet Gears
- 617 Ring Gear
- 620 Sun Gear Teeth
- 621 First Set of Teeth
- 622 Second Set of Teeth
- 624 Planet Carrier
- 626 Ring Gear Teeth
- 627 Keyed Bore
- 631 Input Portion
- 632 Hub
- 633 Input Shaft
- 634 Input Arms
- 635 Keyed Head
- 637 Clutch Barrel
- 638 Bore
- 639 Clutch Retaining Ring
- 641 First Clutch Ball Bearing
- 642 Second Clutch Ball Bearing
- 643 Clutch Spring(s)
- 644 Tangs
- 645 Output Portion
- 646 Hub
- 647 Output Shaft
- 648 Keyed Head
- 649 Output Arms
- 652 Slots
- 654 Clutch Output Ball Bearing
- 656 Edges
- 657 Edges
- 658 Inner Surface
- 659 Outer Surface
- 661 Sun Gear
- 662 Keyed Bore
- 663 Spur Teeth
- 665 Planet Gears
- 667 Ring Gear
- 672 Spur Teeth
- 674 Planet Carrier 675 Ball Bearing
676 Ring Gear Teeth
677 Output Shaft
678 Keyed Bore
679 Keyed Head
681 Output Mandrel Retaining Ring
682 Output Mandrel Bearing
684 First Mandrel Portion
685 Second Mandrel Portion
686 Retaining Clip
691 First Spring Carrier
692 Second Spring Carrier
693 Bore
694 Retaining Clips
695 Idler Crown Bearing
696 Retaining Clips
1102 Motor drive unit
1103 Motor Housing
1104 Counterbalancing Assembly
1105 Counterbalancing Spring
1106 Opening
1107 Drive Wheel
1108*a* First End of Counterbalancing Spring
1108*b* Second End of Counterbalancing Spring
1109 Center Axis of Rotation
1110 Output Mandrel
1111 First Mandrel Portion
1112 Second Mandrel Portion
1113 Retaining Clip
1114 First Spring Carrier
1115 Second Spring Carrier
1116 Keyed Bore
1117 Drive Wheel Adapted
1118 Flange
1119 Keyed Bore
1121 Keyed Head
1122 Keyed Bore
1123 Washer
1124 Hole
1125 Screw
1126 Threaded Bore
1130 Tube
1131 Pin List of Acronyms Used in the Specification in Alphabetical Order The following is a list of the acronyms used in the specification in alphabetical order.

ASICS Application Specific Integrated Circuits
BLDC Brushless Direct Current
CAT5 Category 5 Cable
DC Direct Current
IR Infrared
k Slope of the Torque Profile of the Roller Shade
LAN Local Area Network
LED Light Emitting Diode
$l_{material}$ Length of Shade Material Hanging from the Roller Tube During the Rolled Down Position
$l_{overwrap}$ Length of Shade Material Overwrap (if any)
N mm Newton Millimeter
N m Newton Meter
$N_{pretension}$ Number of Pretensioned Turns
$N_{turns}$ Number of Turns it Takes to Fully Roll Up the Roller Shade
PoE Power Over Ethernet
RAM Random-Access Memory
RF Radio Frequency
ROM Read-Only Memory
$r_{down}$ Radius of the Roller Tube Plus the Thickness of the Shade Material Layers over the Rolle Tube (if any) when the Shade Material is at the Rolled Down Position
$r_{tube}$ Radius of the Roller Tube
$r_{up}$ Radius of the Roller Tube Plus the Thickness of the Shade Material Layers over the Roller Tube When the Shade Material is at the Rolled Up Position
$t_{material}$ Thickness of the Shade Material (Single Layer)
$T_{max}$ Maximum Torque
$T_{min}$ Minimum Torque
$T_{min\_offset}$ Offset Minimum Torque Required of the Spring
$w_{hb}$ Weight of the Hem Bar
$w_{sm}$ Weight of the Shade Material

MODE(S) FOR CARRYING OUT THE INVENTION

For 40 years Crestron Electronics, Inc. has been the world's leading manufacturer of advanced control and automation systems, innovating technology to simplify and enhance modern lifestyles and businesses. Crestron designs, manufactures, and offers for sale integrated solutions to control audio, video, computer, and environmental systems. In addition, the devices and systems offered by Crestron streamlines technology, improving the quality of life in commercial buildings, universities, hotels, hospitals, and homes, among other locations. Accordingly, the systems, methods, and modes of the aspects of the embodiments described herein can be manufactured by Crestron Electronics, Inc., located in Rockleigh, NJ.

The different aspects of the embodiments described herein pertain to the context of counterbalancing and pretensioning roller shades, but is not limited thereto, except as may be set forth expressly in the appended claims. While the roller shade is described herein for covering a window, the roller shade may be used to cover other types of architectural openings, such as doors, wall openings, or the like. The embodiments described herein may further be adapted in other types of window or door coverings, such as inverted rollers, Roman shades, Austrian shades, pleated shades, blinds, shutters, skylight shades, garage doors, or the like. In addition, the embodiments described herein can be used in motor drive units that comprise a motor to drive the roller shade, as described herein, or the counterbalancing and pretensioning assembly discussed herein can be implemented in non-motorized window treatments without departing from the scope of the present embodiments.

Disclosed herein are systems, methods, and modes for counterbalancing a roller shade with one or more pretensioned springs, and more particularly for the attachment of the counterbalancing spring and pretensioning the springs to lower the torque load on the motor of the roller shade throughout the rolling up or rolling down cycles of the roller shade. Disclosed are also systems, methods, and modes for a motor pretensioned roller shade that can be pretensioned using the motor to a preset amount and which locks and maintains the pretension.

To efficiently counterbalance a roller shade, a preset number of pretensioning turns first need to be determined for a given roller shade and its spring. In one embodiment, a torsion spring is utilized. However, other types of springs may be used without departing from the scope of current embodiments. Referring to FIG. 2A, line 105 represents the roller shade torque profile across the number of turns required to roll up an exemplary sized roller shade from a rolled down position, when the shade material is fully unraveled, up to a rolled up position, when the shade material is substantially fully wrapped up around the roller tube. The y-axis represents the torque required in Newton Meter (N m) to roll up a roller shade, and the x-axis represents the number of 360 degree turns the roller shade rotates during the rolling up cycle (i.e., traveling right along the x-axis). Initially, more torque is required to start lifting all the weight of the shade material and the hem bar. As the roller tube rotates, the shade material wraps around the roller tube, resulting in less shade material hanging from the roller tube. Accordingly, as the roller tube keeps rotating, less torque is required to lift the weight of the remaining shade material plus the hem bar. $T_{max}$ 102 represents the maximum torque required to start lifting the entire weight of the shade material and hem bar, while $T_{min}$ 103 represents the minimum torque required to finish lifting the shade material and the hem bar during the rolling up cycle.

Line 206 represents the torque profile of the roller shade's spring. It is desired that the $T_{max}$ 202 and $T_{min}$ 203 values of the spring be set to be substantially equal to the $T_{max}$ 102 and $T_{min}$ 103 values, respectively, of the roller shade torque profile 105. Alternatively, as shown in FIG. 2A, the $T_{max}$ 202 and $T_{min}$ 203 values of the spring may be offset down by a predefined amount from the roller shade $T_{max}$ 102 and $T_{min}$ 103 values, respectively. Reducing the $T_{max}$ 202 and $T_{min}$ 203 values of the spring with respect to the roller shade $T_{max}$ 102 and $T_{min}$ 103 values will ensure that the shade material naturally drops down when the roller shade is rolled down and does not tend to roll back up. As shown in FIG. 2A, $T_{min}$ 103 required to finish lifting the roller shade is not zero. There is always some torque required to finish lifting the shade because of the weight of the hem bar across the width of the shade, some pulling created by the shade material, and the inertia and weight of the roller tube itself. Accordingly, $T_{min}$ set point 203 of the spring has to be brought up from zero to substantially equal to, or slightly offset below $T_{min}$ 103 of the roller shade. This is accomplished by pretensioning the torsion spring such that when the roller shade is fully rolled up, the torsion spring still exerts a preset amount of torque 203 that is substantially equal to or slightly offset below from $T_{min}$ 103 of the roller shade.

With optimally pretensioned torsion spring, the spring assists rolling up the roller shade throughout the rolling up cycle of the roller shade. As a result, the resulting torque 208 required to be exerted by the motor to roll up the roller shade is minimal and substantially steady throughout the rolling up cycle of the roller shade. Similarly, the resulting power 210 shown in FIG. 2B is significantly reduced and is substantially steady throughout the rolling up cycle of the roller shade. As illustrated in the example of FIGS. 2A and 2B, the maximum torque required to be exerted to lift an exemplary sized roller shade is below 0.15 N m, compared to above 0.8 N m of torque required to lift the same sized shade by a motor with the aforementioned prior art counterbalancing system. Similarly, the maximum power required to lift an exemplary sized roller shade is around 0.8 W, compared to 6 W of power required to lift the same sized shade by a motor with the aforementioned prior art counterbalancing system.

In addition, the optimally pretensioned torsion spring also assists the motor to steadily lower the roller shade throughout the entire rolling down cycle (i.e., traveling left along x-axis in FIG. 2A).

The torque profile 105 of a roller shade is effected by various properties of the roller shade. For example, the torque profile 105 of a roller shade varies depending on various factors, such as the roller tube diameter and radius, the diameter and radius of the shade material as it wraps about the roller tube, the shade material thickness, the width and length of the shade material, the number of layers of the shade material about the roller tube, the weight of the shade material, and the weight of the hem bar. Therefore, depending on the window size and the fabric selection, the pretension parameters of the required torsion spring will change. The systems, methods, and modes of the embodiments described herein provide a motorized roller shade assembly that can be pretensioned using its integrated motor by an optimal number of pretension turns such that the $T_{min}$ value 203 of the torsion spring corresponds to the $T_{min}$ value 103 of the roller shade.

The embodiments described herein may be used to quickly and precisely pretension torsion springs to be used in customized roller shades, during the assembly of the customized roller shades at the factory, right after the customer has placed their order. The embodiments described herein may be also used to pretension torsion springs for use in stock roller shades sold in a number of predetermined sizes and shade materials. In yet another embodiment, the pretension of the roller shade may be adjusted or corrected, if necessary, in the field by removing the motor drive unit containing the motor from the roller tube, pretensioning the spring, and reinserting the drive unit into the roller tube. In addition, if a defective motor needs to be replaced, the customized pretensioning information of the defective motor may be transmitted to the replacement motor and used to pretension its spring.

According to an embodiment, to determine the preset number of pretension turns, initially the roller shade properties are determined. FIG. 3A illustrates an end view of a roller shade 300 in a fully rolled down position, and FIG. 3B illustrates an end view of the roller shade 300 in a fully rolled up position. The roller shade properties include one or more of the diameter or radius 306 of the roller tube 301, the weight of the shade material 303, the thickness 309 of the shade material 303 (single layer), the width and length of the shade material 303, and the weight of the hem bar 304 (if any), among others. For customizable roller shades, for example, initially a customer will measure the window dimensions and select the style of the roller shade they want. The customer may pick from a selection of mounting brackets and hardware, hem bars, fabric designs, fabric attributes, such as transparency, translucency, and blackout materials, and the like. A customer may use the Crestron® Design Tool, a one-stop Web-based platform for all the Crestron® Shading Solutions designing, available from Crestron Electronics, Inc. of Rockleigh, NJ. Then, the customer will submit their order to the manufacturer. The manufacturer may use computer software to convert customer requirements to manufacturing specifications for production, as is known in the art. The manufacturing specifications specify, for example, the radius 306 of the roller tube 301 to use, how long to cut the roller tube 301, how long and/or wide to cut the shade material 303, and what type of hardware to use in assembling the customized roller shade, including the type of hem bar 304. All of the above customized properties will drive the weight of the shade material 303 and hem bar 304, and thereby the roller shade torque profile 105.

Using the aforementioned roller shade properties, the $T_{max}$ and $T_{min}$ values of the roller shade 300 are determined. $T_{max}$ represents the maximum torque required to start rolling up the roller shade 300 when the shade material 303 is at the rolled down position and is substantially fully unraveled from the roller tube 301. Thus, as shown in FIG. 3A, substantially the entire weight of the shade material 303 plus the weight of the hem bar 304 need to be pulled up. $T_{max}$ may be determined by the following formula:

$$T_{max}=r_{down}\times(w_{material}+w_{hembar}) \tag{1}$$

where, $T_{max}$ is the maximum torque required to lift the shade material 303 and hem bar 304, $R_{down}$ is the radius 308 of the roller tube 301 plus the thickness 312 of the shade material layers wrapped over the roller tube 301 (if any) when the shade material is at the rolled down position where substantially the entire shade material 303 is unraveled from the roller tube 301, $w_{material}$ is the weight of the entire shade material 303, and $w_{hembar}$ is the weight of the hem bar 304.

According to one embodiment, in roller shades where the entire shade material 303 is unraveled from the roller tube 301 while in the rolled down position, radius ($r_{down}$) 308 equals to the radius ($r_{tube}$) of the roller tube 301. In another embodiment, the roller shade may comprise an overwrap 310 where some length of shade material remains wrapped about the roller tube 301 when the shade material 303 is in the rolled down position. Thickness 312 represents the total thickness of the shade material layers that are wrapped over the roller tube 301. Typically, the overwrap 310 will form a single layer of shade material 303 over the roller tube 301 and as such total thickness 312 would equal to thickness 309 of a single layer of shade material 303. However, the overwrap 310 may form more than a single layer, resulting in greater overall thickness 312 of the shade material layers over the roller tube 301. The shade material overwrap 310 may be used to hide the roller tube 301 and/or to eliminate the pull by the shade material on the point of contact between the shade material 303 and the roller tube 301 and prevent disengagement. In such a case, $r_{down}$ is the radius 308 of the roller tube 301 plus the thickness 312 of the shade material layers over the roller tube 301 that remains wrapped about the roller tube 301 in the rolled down position to account for the additional shade material overwrap 310. According to an embodiment, radius ($r_{down}$) 308 may be determined using the following formula:

$$r_{down}=\sqrt{\frac{t_{material}\times l_{overwrap}}{\pi}+(r_{rt})^2} \tag{2}$$

where, $r_{down}$ is the radius 308 of the roller tube 301 plus the shade material 303 (if any) at the rolled down position, $t_{material}$ is the thickness of the shade material 303 (single layer), $l_{overwrap}$ is the length of shade material overwrap 310 (if any), and $r_{tube}$ is the radius 306 of the roller tube 301.

While the formulas above and below utilize the radius as the measuring parameter, for example for radius 306, 308, and 311, the formulas herein can instead use the diameter parameter without departing from the scope of the present embodiments.

$T_{min}$ represents the minimum torque required to finish rolling up the roller shade 300 when the shade material 303 is at the rolled up position and is substantially fully wrapped around the roller tube 301. As shown in FIG. 3B, the only weight that is being lifted at the end of the rolling up cycle substantially consists of the weight of the hem bar 304. $T_{min}$ may be determined by the following formula:

$$T_{min}=r_{up}\times w_{hembar} \tag{3}$$

where, $T_{min}$ is the minimum torque required to lift the shade material 303 and hem bar 304, $r_{up}$ is the radius 311 of the roller tube 301 plus the thickness 314 of the shade material layers wrapped over the roller tube 301 when the shade material 303 is at the rolled up position when substantially the entire shade material 301 is wrapped around the roller tube 301, and $w_{hembar}$ is the weight of the hem bar 304.

Total thickness 314 of the shade material layers wrapped over the roller tube 301 represents the thickness 309 of the shade material 303 times the number of layers 313 that are wrapped about the roller tube 301 at the rolled up position. According to an embodiment, radius ($r_{up}$) 311 may be determined using the following formula:

$$r_{up}=\sqrt{\frac{t_{material}\times(l_{material}+l_{overwrap})}{\pi}+(r_{tube})^2} \tag{4}$$

where, $r_{up}$ is the radius of the roller tube 301 plus the shade material 303 at the rolled up position, $t_{material}$ is the thickness 309 of the shade material 303 (single layer), $l_{material}$ is the length of the shade material 303 that hangs from the roller tube 301 during the rolled down position, $l_{overwrap}$ is the length of shade material 303 overwrap 310 (if any), and $r_{tube}$ is the radius 306 of the roller tube 301.

Exemplary $T_{max}$ 102 and $T_{min}$ 103 values are illustrated in FIG. 2A.

Using the $T_{min}$ and $T_{max}$ values, a slope is determined for the rate of change of the natural torque profile of the roller shade. The slope is determined using the following formula:

$$k\left(\frac{N\ \text{mm}}{\text{turn}}\right)=\frac{T_{max}-T_{min}}{N_{turns}} \tag{5}$$

where, k is the torque slope of the roller shade, and $T_{max}$ is the maximum torque required to lift the shade material 303 and hem bar 304, $T_{min}$ is the minimum torque required to lift the shade material 303 and hem bar 304, and $N_{turns}$ is the number of turns between a rolled up position (FIG. 3B) and a rolled down position (FIG. 3A) of the roller shade.

According to an embodiment, $N_{turns}$ may be determined using the following formula:

$$N_{turns}=\frac{(r_{up}-r_{down})}{t_{material}} \tag{6}$$

where, $r_{down}$ is the radius 308 of the roller tube 301 plus the shade material 303 (if any) at the rolled down position, $r_{up}$ is the radius 311 of the roller tube 301 plus the shade material 303 at the rolled up position, and $t_{material}$ is the thickness of the shade material 303.

Optionally, as discussed above, the $T_{max}$ 202 and $T_{min}$ 203 values of the spring may be offset from the natural torque profile 105 of the roller shade. This can be accomplished through a static offset, as shown by formula 7 below, or a percentage offset, as shown by formula 8 below.

$$T_{min\_offset}(N\text{ mm})=T_{min}-\text{offset} \quad (7)$$

$$T_{min\_offset}(N\text{ mm})=T_{min}\times(1-\text{offset}_{percentage}) \quad (8)$$

Once the slope and offset $T_{min}$ 203 value are determined, the number of preset pretension turns can be determined using the following formula:

$$N_{pretension}=\frac{T_{min\_offset}}{k} \quad (6)$$

where, $N_{pretension}$ is the number of pretensioned turns, $T_{min\_offset}$ is the offset minimum torque required of the spring, and k is the slope of the torque profile of the roller shade.

If no offset is being made, then $T_{min\_offset}$ is substituted with $T_{min}$ 103 in the above formula. As shown, the number of pretension turns is determined using the slope of the natural torque profile of the roller shade to bring the minimum torque of the torsion spring up from zero torque to the desired minimum torque value, in this example $T_{min}$ 203. As a result, when the determined preset number of pretension turns are put in the spring, $T_{min}$ 203 of the spring is either substantially equal to $T_{min}$ 103 of the roller shade 300, or as shown in FIG. 2A, it is slightly offset below $T_{min}$ 103 of the roller shade 300 by a predetermined amount.

The next section describes an embodiment of a motor drive unit comprising a counterbalancing assembly having a torsion spring that may be pretensioned using the integrated motor of the roller shade and which assists the roller shade to raise and lower the shade during operation. Using the motor, the torsion spring of the counterbalancing assembly can be pretensioned at the factory, or thereafter, to a preset number of turns as required for a particular roller shade to effectively counterbalance the roller shade according to the systems, methods, and modes described above.

Referring to FIG. 4, there is shown a perspective view of a roller shade 400 according to one aspect of the embodiments. Roller shade 400 generally comprises a roller tube 401, a motor drive unit 402, an idler assembly 403, shade material 406, and a hem bar 410. Shade material 410 is connected at its top end to the roller tube 401 and at its bottom end to the hem bar 410. Shade material 406 wraps around the roller tube 401 and is unraveled from the roller tube 401 to cover a window, a door, a wall opening, or any other type of architectural opening. In various embodiments, shade material 406 comprises fabric, plastic, vinyl, or other materials known to those skilled in the art.

Roller tube 401 is generally cylindrical in shape and longitudinally extends from a first end 411*a* to a second end 411*b*. In various embodiments, the roller tube 401 comprises aluminum, stainless steel, plastic, fiberglass, or other materials known to those skilled in the art. The first end 411*a* of the roller tube 401 receives the motor drive unit 402, and the second end 411*b* of the roller tube 401 receives the idler assembly 403.

The idler assembly 403 of the roller shade 100 may comprise an idler pin 409 and an idler body 408 inserted into the second end 411*b* of the roller tube 401. The idler body 408 may be rotatably connected about the idler pin 409. It is inserted into the roller tube 401 and is operably connected to the roller tube 401 such that rotation of the roller tube 401 also rotates the idler body 408. The idler body 408 may comprise a flange 419 to prevent the idler body 408 from sliding entirely into the roller tube 401. The idler body 408 may comprise ball bearings therein (not shown) allowing the idler body 408, and thereby the roller tube 401, rotate with respect to the idler pin 409. The idler pin 409 may include a pin tip 413 disposed on its terminal end to attach the roller shade 400 to a mounting bracket 405*b*.

During installation, the roller shade 400 is mounted on or in a window between the first and second mounting brackets 405*a* and 405*b*. The roller shade 400 may first be mounted to the second mounting bracket 405*b* by inserting the idler pin tip 413 into a keyhole 418 of the second mounting bracket 405*b*. The roller shade 400 may then be mounted to the first mounting bracket 405*a* by snapping the motor head 427 of the motor drive unit 402 to the first mounting bracket 405*a* or coupling the motor drive unit 404 to the first mounting bracket 405*a* using screws. The mounting brackets 405*a* and 405*b* can comprise similar configuration to the CSS-DECOR3 QMT®3 Series Décor Shade Hardware, available from Crestron Electronics, Inc. of Rockleigh, NJ. Other types of brackets may be utilized without departing from the scope of the present embodiments.

The motor drive unit 402 may comprise a motor head 427, a crown adapter wheel 416, a motor housing 407 containing a motor control module 602 and motor 601 (FIG. 6) therein, an idler crown wheel 417, and a counterbalancing assembly 404 including a counterbalancing spring 420, output mandrel 610, and a drive wheel 421. The motor drive unit 402 may be inserted into the roller tube 401 from the first end 411*a*. The crown adapter wheel 416, idle crown wheel 417, and drive wheel 421 are generally cylindrical in shape and are inserted into and operably connected to roller tube 401 through its first end 411*a*. Crown adapter wheel 416, idle wheel 417, and drive wheel 421 may comprise a plurality of channels 422 extending circumferentially about their external surfaces. Channels 422 mate with complementary projections 424 radially extending from an inner surface 434 of roller tube 401 such that crown adapter wheel 416, idle crown wheel 417, drive wheel 421, and roller tube 401 rotate together during operation. Crown adapter wheel 416 and idler crown wheel 417 can further comprise a plurality of teeth 425 extending circumferentially about their external surfaces to form a friction fit with the inner surface of the roller tube 401. Crown adapter wheel 416 can further comprise a flange 426 radially extending therefrom. Flange 426 prevents the crown adapter wheel 416 from sliding entirely into the roller tube 401, such that the motor head 427 remains exterior to the roller tube 401. The crown adapter wheel 416 removably and releasably couples the motor drive unit 402 to the roller tube 401. The drive wheel 421 is operably connected to the output shaft 605 of the motor 601 as will be later described such that rotation of the motor output shaft 605 also rotates the drive wheel 421. The crown adapter wheel 416 may be rotatably attached to a first end of the motor housing 407 via ball bearings therein (not shown), while the idle wheel 417 may be rotatably attached to a second end of the motor housing 407 via ball bearings 695 (FIG. 10) therein. This ensures that the motor 601 (FIG. 6)

is held concentric to the roller tube 401 at the front and the rear of the motor housing 407 by the crown adapter wheel 416 and the idle wheel 417.

In operation, the roller shade 400 is rolled down and rolled up via the motor drive unit 402. Particularly, the motor 601 drives the drive wheel 421, which in turn engages and rotates the roller tube 401. The roller tube 401, in turn, engages and rotates the crown adapter wheel 416, idle crown wheel 417, and idler body 408 with respect to the motor 601, while the motor housing 407, including the motor 601 and motor control module 602, remain stationary. As a result, the shade material 406 may be lowered from an opened or rolled up position, when substantially the entire shade material 406 is wrapped about the roller tube 401, to a closed or rolled down position, when the shade material 406 is substantially unraveled, and vice versa.

FIG. 5 is an illustrative block diagram 500 of the motor drive unit 402 according to one embodiment. The motor drive unit 402 may comprise the motor 601 and a motor control module 602. The motor control module 602 operates to control the motor 601, directing the operation of the motor, including its direction, speed, and position. The motor control module 602 may comprise fully integrated electronics. The motor control module 602 can comprise a controller 504, a memory 506, a communication interface 510, a user interface 509, and a light indicator 507.

Power supply 502 can provide power to the circuitry of the motor control module 602, and in turn the motor 601. Power can be supplied to the motor control module 602 through a power cord 428 (FIG. 4) by connecting a terminal block 432 to a dedicated power supply 502, such as the CSA-PWS40 or CSA-PWS10S-HUB-ENET power supplies, available from Crestron Electronics, Inc. of Rockleigh, NJ. In another embodiment, the motor drive unit 402 may be battery operated and as such may be connected to an internal or external power supply 502 in a form of batteries. In yet another embodiment, the motor drive unit 402 may be powered via solar panels placed in proximity to the window to aggregate solar energy.

Controller 504 can represent one or more microprocessors, and the microprocessors can be "general purpose" microprocessors, a combination of general and special purpose microprocessors, or application specific integrated circuits (ASICs). Controller 504 can provide processing capability to provide processing for one or more of the techniques and functions described herein. Memory 506 can be communicably coupled to controller 504 and can store data and executable code. In another embodiment, memory 506 is integrated into the controller 504. Memory 506 can represent volatile memory such as random-access memory (RAM), but can also include nonvolatile memory, such as read-only memory (ROM) or Flash memory.

Motor control module 602 may further comprise a communication interface 510, such as a wired or a wireless communication interface, configured for receiving control commands from an external control point. The wireless interface may be configured for bidirectional wireless communication with other electronic devices over a wireless network. In various embodiments, the wireless interface 510 can comprise a radio frequency (RF) transceiver, an infrared (IR) transceiver, or other communication technologies known to those skilled in the art. In one embodiment, the wireless interface 510 communicates using the infiNET EX® protocol from Crestron Electronics, Inc. of Rockleigh, NJ. infiNET EX® is an extremely reliable and affordable protocol that employs steadfast two-way RF communications throughout a residential or commercial structure without the need for physical control wiring. infiNET EX® utilizes 16 channels on an embedded 2.4 GHz mesh network topology, allowing each infiNET EX® device to function as an expander, passing command signals through to every other infiNET EX® device within range (approximately 150 feet or 46 meters indoors), ensuring that every command reaches its intended destination without disruption. In another embodiment, communication is employed using the ZigBee® protocol from ZigBee Alliance. In yet another embodiment, wireless communication interface 510 may communicate via Bluetooth transmission.

A wired communication interface 510 may be configured for bidirectional communication with other devices over a wired network. The wired interface 510 can represent, for example, an Ethernet or a Cresnet® port. Cresnet® provides a network wiring solution for Crestron® keypads, lighting controls, thermostats, and other devices. The Cresnet® bus offers wiring and configuration, carrying bidirectional communication and 24 VDC power to each device over a simple 4-conductor cable.

In various aspects of the embodiments, the communication interface 510 and/or power supply 502 can comprise a Power over Ethernet (POE) interface. The controller 504 can receive both the electric power signal and the control input from a network through the PoE interface. For example, the PoE interface may be connected through category 5 cable (CAT5) to a local area network (LAN) which contains both a power supply and multiple control points and signal generators. Additionally, through the PoE interface, the controller 504 may interface with the internet and receive control inputs remotely, such as from a homeowner running an application on a smart phone.

Motor control module 602 can further comprise a local user interface 509, such as a buttons disposed on the motor head 427 (not shown), that allows users to set up the motor drive unit 402 at the factory, for example to pretension the motor drive unit 402, or after installation in the field, for example to set the shade upper and lower limits. Furthermore, the motor control module 602 may comprise a light indicator 507, such as a multicolor light emitting diode (LED) disposed on the motor head 427 (not shown), for indicating the motor status.

The control commands received by the controller 504 may be a direct user input to the controller 504 from the user interface 509 or a wired or wireless signal from an external control point. For example, the controller 504 may receive a control command from a wall-mounted button panel or a touch-panel in response to a button actuation or similar action by the user. Control commands may also originate from a signal generator such as a timer or a sensor. Accordingly, the motor control module 602 can integrate seamlessly with other control systems using the communication interface 510 to be operated from keypads, wireless remotes, touch screens, and wireless communication devices, such as smart phones. Additionally, the motor control module 602 can be integrated within a large scale building automation system or a small scale home automation system and be controllable by a central control processor, such as the PRO3 control processor available from Crestron Electronics, Inc., that networks, manages, and controls a building management system.

FIGS. 6-10 illustrate various views of the motor drive unit 402 in greater detail. Specifically, FIG. 6 shows a first side perspective view of the motor drive unit 402; FIG. 7 shows a second side perspective view of the motor drive unit 402, FIG. 8 shows a cross-sectional view of the motor drive unit 402, FIG. 9 shows an exploded perspective view of the drive assembly portion of the motor drive unit 402; and FIG. 10 shows an exploded perspective view of the counterbalancing assembly portion of the motor drive unit 402. Referring to FIGS. 6-8, motor drive unit 402 includes a motor housing 407 that houses the motor control module 602 and the motor 601. According to an embodiment, the motor 601 is suspended in the motor housing 407 using a rubber O-ring 603 at the front of the motor 601 and a rubber locking strip 604 at the rear of the motor 601. This allows the motor 601 to be substantially centered within the motor housing 407. The motor 601 may comprise a brushless direct current (BLDC) electric motor. In another embodiment, the motor 601 comprises a brushed direct current (DC) motor, or any other motor known in the art.

The motor 601 drives the drive wheel 421 through a drive assembly comprising a series of drive train components and a counterbalancing assembly 404 that in combination provide efficiency and counterbalancing to the roller shade. Particularly, between the motor 601 and the drive wheel 421, the motor drive unit 402 may comprise a first stage planetary gear 606, a clutch 608, a final stage planetary gear 609, an output mandrel 610, and a counterbalancing spring 420. In one embodiment, the first and final stage planetary gears 606 and 609 may be configured for providing speed reduction and torque increase to achieve efficient operation of the motor 601. According to another embodiment, the first and final stage planetary gears 606 and 609 may be configured for providing increased speed and decreased torque. According to various aspects of the embodiment, the motor drive unit 402 may comprise less, additional, or no planetary gears. In operation, the output shaft 605 of the motor 601 drives into the first stage planetary gear 606, which in turn drives into an input stage of a clutch 608, which drives into an input stage of the final stage planetary gear 609, which drives the output mandrel 610, and which drives the drive wheel 421, as described below.

Referring to FIGS. 8 and 9, the motor 601 comprises an output shaft 605 that is operably connected to an input of the first stage planetary gear 606. The input of the first stage planetary gear 606 may comprise a sun gear 612. The motor output shaft 605 may comprises teeth 611 disposed circumferentially thereon that engage teeth 613 disposed inside a bore 614 at the proximal side of the sun gear 612 such that rotation of the output shaft 605 also rotates the sun gear 612 along center axis 604. The distal side of the sun gear 612 may comprise helical shaped teeth 620 opposite bore 614.

The first stage planetary gear 606 may further comprise planet gears 615 and a ring gear 617. The planet gears 615 may be mounted on a rotating planet cage or carrier 624. According to an embodiment, three planet gears 615 may be evenly spaced apart and circumferentially arranged around the center axis of rotation 604. Although a different number of planet gears 615 may be used. Each planet gear 615 may comprise a stepped gear having one portion with a first set of helical shaped teeth 621 of larger diameter and another portion with a second set of spur teeth 622 of smaller diameter. Teeth 620 of sun gear 612 are configured to engage the first set of teeth 621 of the planet gears 615. The second set of teeth 622 of the planet gears 615 are configured to engage teeth 626 located inside the ring gear 617. Ring gear 617 may be secured to the motor housing 407 such that it is stationary during motor rotation.

During operation, the motor output shaft 605 spins the sun gear 612 around the center axis 604. The sun gear 612 meshes with the planet gears 615, which rotate around their own respective axes and mesh with the ring gear 617. As a result, the planet gears 615, along with planet carrier 624, revolve around the sun gear 612 such that they orbit the sun gear 612 as they roll along the ring gear 617. As the sun gear 612 is turned by the motor output shaft 605 at a high speed, the planet carrier 622 delivers low-speed, high-torque output to the clutch 608. The output of the first stage planetary gear 606 may comprise a keyed bore 627 in the planet carrier 624.

The clutch 608 may comprise an input portion 631 comprising a circular hub 632 from which center an input shaft 633 extends. The input shaft 633 comprises a keyed head 635 configured for mating with the keyed bore 627 of the planet carrier 624 of the first stage planetary gear 606. A clutch retaining ring 639 may be used to retain the input shaft 633 such that it does not translate longitudinally with respect to the motor housing 407. The input portion 631 further comprises a pair of input arms 634 extending from the periphery of the input hub 632 in the same direction as the input shaft 633. The clutch 608 further comprises a stationary clutch barrel 637 that does not rotate and is supported by the motor housing 407. One or more clutch springs 643 are configured for being positioned concentrically over the clutch barrel 637. Clutch springs 643 may each comprise a torsion spring comprising a pair of tangs 644 laterally extending therefrom. The clutch barrel 637 comprises a bore 638 configured for receiving a first and second clutch ball bearings 641 and 642 therein. First and second clutch ball bearings 641 and 642 in turn receive the input shaft 633 of the clutch input portion 631 such that it can freely rotate with respect to the clutch barrel 637 and the motor housing 407. The various ball bearings discussed herein may generally comprise an outer race, an inner race, and a plurality of balls disposed therebetween, as is well known in the art. The input arms 634 are each positioned over the springs 643 such that the edges 656 of the input arms 634 are positioned between the inner surfaces 658 of the spring tangs 644.

The clutch further comprises an output portion 645 comprising a circular hub 646 from which center an output shaft 647 extends, in an opposite direction from the input shaft 633. Output shaft 647 comprises a keyed head 648 configured for mating with the input of the final stage planetary gear 609. The output shat 647 is further received by a clutch output ball bearing 654 such that the output portion 645 may freely rotate with respect to the motor housing 407. The output portion 645 further comprises a pair of output arms 649 extending from the circular hub 646 in the same direction as input arms 634. The output arms 649 are configured to fit over the hub 632 of the input portion 631 orthogonal to the pair of input arms 634 of the input portion 631. The output arms 649 are each positioned over the springs 643 such that the edges 657 of the output arms 649 are positioned between the outer surfaces 659 of the spring tangs 644. As such slots 652 are formed between the pair of input arms 634 and the pair of output arms 649 configured for receiving the tangs 644 of the clutch springs 643 (FIGS. 6-7).

In operation, as the motor output shaft 605 rotates, in either clockwise or counterclockwise direction, the clutch input portion 631 also rotates causing the edges 656 of the input arms 634 of the input portion 631 engage the inner surfaces 658 of the tangs 644 of the clutch springs 643. This causes the clutch springs 643 to loosen with respect to the clutch barrel 637 allowing the clutch springs 643, the input portion 631, and thereby the output portion 645 to further rotate. On the other hand, if rotational motion is applied to the output portion 645, in either clockwise or counterclockwise direction, the edges 657 of the output arms 649 of the output portion 645 will engage the outer surfaces 659 of the tangs 644 of the clutch springs 643. This causes the clutch springs 643 to tighten around the clutch barrel 637 preventing the clutch springs 643, the input portion 631, and thereby the output portion 646 from further rotation. As such, the clutch 608 allows the motor 601 to drive rotational motion through the clutch 608 in direction D1 (FIG. 8) to drive the drive wheel 421 to rotate the roller tube 401 either clockwise or counterclockwise. However, rotational motion is prevented back through the clutch 608 in direction D2 (FIG. 8) that originates from rotation of the roller tube 401, the drive wheel 421, or the output portion 645 of the clutch 608. For example, the clutch 608 locks rotation of the motor drive unit 402 if someone tries to pull on the fabric. Additionally, when the motor 601 stops, the clutch 608 holds the position of the roller shade 400, allowing the motor 601 to shut down and not exert any power to hold the roller shade 400 in place. Beneficially, the clutch 608 further holds the pretension of the spring 420 as will be further described below.

The final stage planetary gear 609 may comprise a similar configuration to the first stage planetary gear 606 and operate in a similar manner. Accordingly to an embodiment, the final stage planetary gear 609 may provide the same, larger than, or smaller than speed and/or torque increase or decrease as the first stage planetary gear 606. Particularly, the final stage planetary gear 609 may comprise a sun gear 661 comprising a keyed bore 662 configured for receiving the keyed head 648 of the output portion 645 of the clutch 608 such that rotation of the output shaft 605 of the motor translates rotation to the sun gear 661 along center axis 604. The distal side of the sun gear 661 may comprise spur teeth 663 opposite bore 662.

The final stage planetary gear 609 may further comprise a ring gear 667 and planet gears 665 mounted on a rotating planet carrier 674. According to an embodiment, three planet gears 665 may be evenly spaced apart and circumferentially arranged on planet carrier 674 around the center axis of rotation 604. Although a different number of planet gears 665 may be used. Each planet gear 665 may comprise a single gear with spur teeth 672 configured to engage teeth 663 of the sun gear 661 as well as the teeth 676 located inside the ring gear 667. The planet carrier 674 may comprise an output shaft 677 configured to be received within ball bearing 675 such that the output shaft 677 may freely rotate with respect to the motor housing 407. Ring gear 667 may be secured to the motor housing 407 such that it is stationary during motor rotation.

During operation, the clutch output shaft 647, through the action of the motor output shaft 605, spins the sun gear 661 around the center axis 604. The sun gear 661 meshes with the planet gears 665, which rotate around their own respective axes and mesh with the ring gear 667. As the sun gear 661 is turned, the planet carrier 674 may deliver lower-speed, higher-torque output to the output mandrel 610. The output of the final stage planetary gear 609 may comprise a keyed bore 678 within the output shaft 677 of the planet carrier 674 that mates with a keyed head 679 of the output mandrel 610.

The output mandrel 610 may be retained within the motor housing 407 using a retaining ring 681 such that it does not translate longitudinally along the center axis 604. In addition, the output mandrel 610 may be received within an output mandrel bearing 682 such that it can rotate freely with respect to the motor housing 407. The output mandrel 610 may extend from a first end connected to the final stage planetary gear 609 within the motor housing 407, out of an opening 433 in the motor housing 407 (FIG. 10), and to a second end slidably connected to the drive wheel 421. According to one embodiment, output mandrel 610 may comprise a single body. Yet according to another embodiment, output mandrel 610 may comprise a first mandrel portion 684 and a second mandrel portion 685. The first mandrel portion 684 can comprise a keyed bore while the second mandrel portion 685 can comprise an extrusion with keyed grooves configured to mate with the keyed bore of the first mandrel portion 684. The second mandrel portion 685 can be inserted into the keyed bore of the first mandrel portion 684 and be secured using a retaining clip 686 such that rotation of the first mandrel portion 684 by the motor 601 also rotates the second mandrel portion 685.

Referring to FIGS. 8 and 10, the motor housing 407 may comprise retaining clips 694 such that an idler crown bearing 695 may snap over the motor housing 407. The idler crown wheel 417 may in turn snap over the idler crown bearing 695 and freely rotate over the motor housing 407. This helps to justify and center the motor housing 407 within the roller tube 401 such that the output mandrel 610 is substantially aligned with and rotates about the center axis of rotation 604.

The counterbalancing spring 420 longitudinally extends from a first end **423*a* to a second end 423*b*. Motor housing 407 may comprise a first spring carrier 691 comprising threads on its outer surface configured for engaging and retaining the coils of the spring 420 at its first end 423*b*. On the opposite end, drive wheel 421 may comprise a second spring carrier 692 comprising threads on its outer surface configured for engaging and retaining the coils of the spring 420 at its second end 423*b*. Spring 420 is mounted about the output mandrel 610, which holds and stabilizes the spring 420 within the roller tube 401, preventing the spring 420 from sagging within the roller tube 401**.

Referring to FIG. 4, the drive wheel 421 comprises an external surface 435 that slidably contacts the inner surface 434 of the roller tube 401. Drive wheel 421 is dimensioned and constructed such that it can longitudinally travel within the roller tube 401 via channels 422 and projections 424 along center axis 604. This translation allows the drive wheel 421 to be displaced longitudinally when the motor drive unit 402 is inserted into the roller tube 401 during installation. Additionally, as the spring 420 is tensioned during its pretensioning at the factory or during the operation of the roller shade 400, it will extend or contract in length. The longitudinal translation of drive wheel 421 allows the spring 420 to freely extend or contract in length within the roller tube 401, as required. In addition, referring back to FIGS. 8 and 10, the drive wheel 421 may further comprise a keyed bore 693 that slidably retains the output mandrel 610. The output mandrel 610 may comprise a shape complementary to the keyed bore 693 such that rotation of the output mandrel 610 also rotates the drive wheel 421. In one embodiment, the bore 693 may contain lubricant therein such that the drive wheel 421 may longitudinally travel along the output mandrel 610. As such, rotation of the motor output shaft 605 also rotates the drive wheel 421, which in turn rotates the roller tube 401. However, the drive wheel 421 may longitudinally travel with respect to the output mandrel 610 as the spring 420 extends or contracts in length during pretensioning or during normal operation of the roller shade 400.

Using the above discussed assembly, the roller shade 400 may then be pretensioned by the above determined pretension turns ($N_{pretension}$) in either a clockwise or counterclockwise direction, depending in which direction the motor drive unit 402 needs to turn to unravel the shade material 406 from the roller tube 401 and the direction of the spring coils. For example, if the roller shade 400 is configured to lift the shade material 406 from a closed position to an opened position in a counterclockwise direction, the spring 420 should be pretensioned in a clockwise direction. On the other hand, if the roller shade 400 is configured to lift the shade material 406 from a closed position to an opened position in a clockwise direction, the spring 420 should be pretensioned in a counterclockwise direction.

During the assembly of the roller shade 400 at the factory, the specifications of the required spring 420 and the number of pretension turns may be determined based on the roller shade properties to efficiently counterbalance the roller shade 400. According to an embodiment, for each roller tube diameter, a factory may maintain an inventory of springs with the same spring diameter and coil diameter. The spring 420 length may be cut to size based on the shade configuration. According to another embodiment, the factory may maintain an inventory of springs 420 with length at 1 inch or half inch increments that can be chosen for assembly based on the shade configuration. Then, based on the shade configuration and spring parameter, a preset number of pretension turns may be determined as discussed above in greater detail.

To pretension the roller shade 400, the motor drive unit 402 may then enter into a pretensioning mode to pretension the spring 420 according to the predetermined number of pretension turns, for example in a counterclockwise direction. For example, the pretensioning mode may be initiated by pressing a button or a combination of buttons using the user interface 509. According to an embodiment, the motor controller 504 may indicate that it is in the pretensioning mode by blinking the light indicator 507 red. The determined number of pretension turns may be communicated to the motor controller 504 in a variety of ways. According to an embodiment, a technician may connect the motor drive unit 402 to a programming computer or tool (not shown) via the communication interface 510 and enter shade parameters and spring parameters into the programming computer. The programming computer may calculate the preset number of pretension turns and communicate that information to the motor controller 504. According to another embodiment, the technician may enter the preset number of pretension turns via the user interface 509. The motor controller 504 may store the predetermined number of pretension turns in memory 506.

The motor drive unit 402 is pretensioned while it is located outside the roller tube 401, such that rotation of the drive wheel 421 is located outside the roller tube 401 and is not hindered by any object. According to an embodiment, the motor drive unit 402 may be placed on a rack that holds the motor housing 407 still, but which does not contact the drive wheel 421. According to another embodiment, the technician may hold the motor housing 407, without contacting the drive wheel 421, during pretensioning.

The motor controller 504 will then signal the motor 601 to rotate the motor output shaft 605 a predetermined number of turns in the counterclockwise direction while the motor housing 407 is held stationary. Because the motor drive unit 402 may comprise a plurality of planetary gear assemblies 606 and 609, the actual number of revolutions that the motor output shaft 605 needs to turn to achieve the predetermined number of pretension turns at the spring 420 may be adjusted by a predetermined ratio depending on the configuration of the planetary gear assemblies 606 and 609. As discussed above, the motor output shaft 605 will drive the output mandrel 610 and drive wheel 421 through the first stage planetary gear 606, clutch 608, and final stage planetary gear 609. As the drive wheel 421 rotates in the counterclockwise direction, the second spring carrier 692 also rotates in a counterclockwise direction, while the first spring carrier 691 and motor housing 407 remain stationary. This results in pretensioning the counterbalancing spring 420 as its second end 423*b*, connected to the second spring carrier 692, rotates in a counterclockwise direction with respect to its first end 423*a*, connected to the first spring carrier 691. Pretensioning turns are then applied by continual rotation of the drive wheel 421 with respect to the motor housing 407 until the predetermined number of pretensioning turns is reached.

After the desired number of pretensioning turns is reached, the motor 601 may stop and the motor controller 504 may exit the pretensioning mode, stop blinking the light indicator 507 red, and turn the light indicator 507 green to indicate that the pretensioning mode is complete. The technician may then complete assembling the roller shade 400 by inserting the pretensioned motor drive unit 402 into the roller tube 401 and packaging the roller shade 400. After its assembly, the roller shade 400 is shipped out to the customer to be installed in a window.

According to the aspects of the present embodiments, by preventing any rotational motion back from the drive wheel 421, the clutch 608 locks the pretension in the spring 420. As such, any torque generated by the counterbalancing spring 420 due to its pretension cannot translate back through clutch 608. In other words, the pretension of spring 420 causes the second end 423*b* of the spring 420 to exert torque on the second spring carrier 692, and thereby on the drive wheel 421 and output mandrel 610, in a clockwise direction with respect to the first end 423*a* of the spring 420, the first spring carrier 691, and motor housing 407. However, the torque generated by the spring 420 cannot force the drive wheel 421 to rotate back in the clockwise direction since rotational motion through the clutch 608 in direction D2 (FIG. 8) is locked. This is because the output portion 645 of the clutch 608 is prevented from being rotated with respect to the input portion 631 of the clutch 608 via the clutch springs 643, as discussed above. Accordingly, the pretension is locked by the clutch 608 preventing the counterbalancing spring 420 from unwinding. According to an embodiment, the preset number of pretension turns may comprise full 360 degree turns. However, since the pretension is achieved via motor rotation and may be locked via clutch 608 at any orientation, the preset number of pretension turns may include any fraction of 360 degree incremental turns. For example, the preset number of turns could comprise 35.4 turns.

On the other hand, during operation of the roller shade 400, the motor 601 can still rotate the motor output shaft 605, and thereby the drive wheel 421 and roller tube 401, since rotational motion can still pass through clutch 608 in direction D1 (FIG. 8), as discussed above. To roll down the roller shade 400, the motor 401 rotates the drive wheel 421 and thereby the second spring carrier 692 and roller tube 401 in a counterclockwise direction, while the motor housing 407 and thereby the first spring carrier 692 remain stationary. Rotation of the motor 601, as well as the increasing weight of the shade material 406 and the hem bar 41, cause the counterbalancing spring 420 to progressively build torque. The pretensioning ensures that the rolling down cycle of the roller shade 400 starts at the desired $T_{min}$ value 203, as discussed above with reference to FIG. 2A. As the roller shade 400 rolls down, counterbalancing spring 420 continues to build torque in substantially a linear fashion (traveling left along the x-axis in the diagram of FIG. 2A) until the $T_{max}$ value 202 is reached. As the roller shade 400 rolls down, the shade material 406 gradually unravels and progressively more shade material 409 hangs down from the roller tube 401. The increasing weight of the shade material 406 and the hem bar 410 assist the motor 401 to build torque in the counterbalancing spring 420 throughout the rolling down cycle without the motor 401 requiring to exert much power, as shown by the exerted motor torque 208 and power 210.

When rolling up the shade 400, the torque that was built up in the counterbalancing spring 420 during the rolling down cycle assists the motor 401 to roll up the shade 400 during the entire rolling up cycle (traveling right along the x-axis in the diagram of FIG. 2A). As the roller shade 400 rolls up, counterbalancing spring 420 releases torque in a substantially linear fashion until the $T_{min}$ value 203 is reached. The decreasing weight of the shade material 406 and the hem bar 410 combined with the progressively released torque by the spring 420 effectively assist the motor 401 to roll up the shade material 460 throughout the rolling up cycle without the motor 401 requiring to exert much power, as shown by the exerted motor torque 208 and power 210. Spring 420 assists the motor 401 to finish rolling up the shade material 406 all the way through the end of the rolling up cycle because the torque of the counterbalancing spring 420 does not return to zero, but returns to the $T_{min}$ value 203 as a result of the pretension.

At the end of each rolling up cycle, the pretension put into the spring 420 continues to be locked by the clutch 608. The pretension continues to be locked even if the roller shade 400 is knocked down or hit accidentally, or when the shade needs to be removed and reinstalled. Beneficially, the roller shade 400 may be easily serviced by a field technician or repaired as the roller shade may be easily disassembled and the factory specified pretension turns may be put back into the spring 420. In addition, if a defective motor needs to be replaced, the customized pretensioning information of the defective motor stored in memory 506 may be transferred to and used by the replacement motor to pretension its spring.

According to further aspects of the embodiments, pretensioning of the roller shade 400 can be accomplished in a clockwise direction in a substantially similar manner as discussed above, but with rotation of the motor output shaft 605, and thereby drive wheel 421, in a clockwise direction with respect to the motor housing 407. According to an embodiment, a different torsion spring may be used with coils winding in a clockwise direction. Pretension of the roller shade 400 may then be locked in a clockwise direction and the roller shade 400 can rotate in a clockwise direction to roll down the shade material 406, and in counterclockwise direction to roll up the shade material 406 in substantially the same way as discussed above.

Referring to FIGS. 11 through 13, there is shown another embodiment of the counterbalancing assembly 1101 of a motor drive unit 1102, where FIG. 11 shows a perspective view, FIG. 12 shows an exploded view, and FIG. 13 shows a cross-sectional view of the counterbalancing assembly portion 1101 of the motor drive unit 1102. Motor drive unit 1102 can be similarly installed within and operably cooperate with the roller tube 401 of shade 400 as discuss above. The drive portion of the motor drive unit 1102 can comprise similar construction as motor drive unit 402, including a motor 601, a motor control module 602, and one or more of the drive train components 606-609 as discussed above located within a motor housing 1103.

The motor 601 and the drive train components drive an output mandrel 1110 that extends from a first end connected to the drive train within the motor housing 1103, out of an opening 1106 in the motor housing 1103, and to a second end connected to a drive wheel 1107. Output mandrel 1110 may comprise a single body, or may be made of a plurality of portions including a first mandrel portion 1111 and a second mandrel portion 1112. The first mandrel portion 1111 can comprise a keyed bore while the second mandrel portion 1112 can comprise an extrusion with keyed grooves configured to mate with the keyed bore of the first mandrel portion 1111 and be secured using a retaining clip 1113 such that rotation of the first mandrel portion 1111 by the motor 601 also rotates the second mandrel portion 1112.

The drive wheel 1107 comprises an external surface that slidably contacts the inner surface of the roller tube 401. Drive wheel 1107 can be longitudinally inserted into the roller tube 401 during installation via channels (e.g., 422) and projections (e.g., 424). Drive wheel 1107 may comprise a rubber material and may connect to the terminal end of the mandrel 1110 via a drive wheel adapter 1117 and screw 1125. Particularly, drive wheel 1107 may comprise a keyed bore 1122 adapted to receive the keyed head 1121 of drive wheel adapter 1117. Drive wheel adapter 1117 in turn contains a keyed bore 1119 adapted to receive the terminal end of the mandrel 1110 therein. Drive wheel 1107 and drive wheel adapter 1117 are secured to the terminal end of the mandrel 1110 via washer 1123 and screw 1125. Screw 1125 contains threads and extends through a hole 1124 in the washer 1124 and threadably secures to a threaded bore 1126 longitudinally extending in the terminal end of the mandrel 1110 as shown in FIG. 13. As such, drive wheel 1107 is secured to the terminal end of the mandrel 1110 such that rotation of the output mandrel 1110 also rotates the drive wheel 1107.

The counterbalancing spring 1105 longitudinally extends from a first end 1108*a* to a second end 1108*b*. Spring 1105 is mounted about the output mandrel 1110, which holds and stabilizes the spring 1105 within the roller tube 401. Additional tube 1130 may be sleeved over the output mandrel 1110 such that it is located within the spring 1105 to reduce the amount of movement between the torsion spring 1105 and the mandrel 1110 and to reduce noise. A pin 1131 may secure the tube 1130 to the mandrel 1110 to prevent longitudinal movement.

Motor housing 1103 may comprise a first spring carrier 1114 including threads on its outer surface to engage and retain the coils at the first end 1108*a* of spring 1105. The second end 1108*b* of the spring 1105 may be connected to a second spring carrier 1115, which in this embodiment is disposed separately from the drive wheel 1107. The second spring carrier 1115 may contain a body having threads on its outer surface configured for engaging and retaining the coils at the second end 1108*b* of the spring 1105. Spring carrier 1115 may further comprise a flange 1118 to prevent the spring coils to extend over and beyond the end of the spring carrier body. The body of the second spring carrier 1115 may comprise a keyed bore 1116 adapted to slidably receive the output mandrel 1110 therein. In one embodiment, the bore 1116 may contains lubricant therein such that the second spring carrier 1115 may longitudinally travel along the output mandrel 1110. During operation or pretensioning, rotation of the motor output shaft 1110 by the motor 601 via the drive train also rotates the drive wheel 1107, which in turn rotates the roller tube 401. Rotation of the motor output shaft 1110 also rotates the second spring carrier 1115 with respect to the first spring carrier 1114, which remains stationary. This introduces tension to or releases tension from the spring 1105 depending on the direction of travel, as discussed above in greater detail. While the second spring carrier 1115 rotates, it longitudinally translate within the roller tube 401. Particularly, as the spring 1105 is tensioned during its pretensioning at the factory or further tensioned or releases tension during the operation of the roller shade 400, it will extend or contract in length. The longitudinal translation of the second spring carrier 1115 allows the spring 1105 to freely extend or contract in length within the roller tube 401, as required. According to an embodiment, the output mandrel 1110 is sized to a length such that the second spring carrier 1115 does not come in contact with the drive wheel 1107 when the shade material is at the rolled down position and thereby the spring 1105 is at its maximum extended limit for that roller shade.

INDUSTRIAL APPLICABILITY

To solve the aforementioned problems, the aspects of the embodiments are directed toward systems, methods, and modes for counterbalancing and pretensioning a roller shade via a motor to lower the torque load on the motor of the roller shade throughout the rolling up or rolling down cycles. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

Although the features and elements of aspects of the embodiments are described being in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

All United States patents and applications, foreign patents, and publications discussed above are hereby incorporated herein by reference in their entireties.

ALTERNATE EMBODIMENTS

Alternate embodiments may be devised without departing from the spirit or the scope of the different aspects of the embodiments. The embodiments described herein may be used for covering windows as well as doors, wall openings, or the like. The embodiments described herein may further be adapted in other types of window or door coverings, such as inverted rollers, Roman shades, Austrian shades, pleated shades, blinds, shutters, skylight shades, garage doors, or the like.

Moreover, the processes described herein are not meant to limit the aspects of the embodiments, or to suggest that the aspects of the embodiments should be implemented following these processes. The purpose of the aforementioned processes is to facilitate the understanding of one or more aspects of the embodiments and to provide the reader with one or many possible implementations of the processes discussed herein. The steps performed during the aforementioned processes are not intended to completely describe the processes but only to illustrate some of the aspects discussed above. It should be understood by one of ordinary skill in the art that the steps may be performed in a different order and that some steps may be eliminated or substituted.

The invention claimed is:

1. A roller shade comprising:

a roller tube;

a shade material attached to the roller tube; and a motor drive unit at least partially disposed within the roller tube, wherein the motor drive unit comprises:

a motor adapted to drive a motor output shaft;

an output mandrel operably connected to the motor output shaft;

a motor housing longitudinally extending from a first end to a second end and adapted to house the motor therein and comprising a first spring carrier adapted to be stationary during operation of the motor;

a crown adapter wheel rotatably connected to the first end of the motor housing and operably connected to the roller tube;

an idle crown wheel rotatably connected to the second end of the motor housing and operably connected to the roller tube;

a drive wheel operably connected to the output mandrel and the roller tube;

a second spring carrier operably connected to the output mandrel;

a counterbalancing spring longitudinally extending from a first end connected to the first spring carrier to a second end connected to the second spring carrier;

wherein during operation of the motor, rotation of the motor output shaft causes rotation of the output mandrel and thereby the drive wheel, the second spring carrier, and the roller tube, and wherein as the motor output shaft rotates, the motor, the first spring carrier, and the motor housing remain stationary while the crown adapter wheel, the idle crown wheel, and the roller tube rotate about the motor housing.

2. The roller shade of claim 1, wherein the counterbalancing spring is adapted to be pretensioned by the motor while the motor drive unit is located outside the roller tube.

3. The roller shade of claim 2, wherein the counterbalancing spring is adapted to be pretensioned by rotation of the motor output shaft, which causes rotation of the second spring carrier and thereby rotation of the second end of the counterbalancing spring in a first direction with respect to the first end of the counterbalancing spring and the first spring carrier.

4. The roller shade of claim 3, wherein during operation of the roller shade, rotation of the motor output shaft to roll down the shade material causes further rotation of the second end of the counterbalancing spring in the first direction with respect to the first end of the counterbalancing spring, thereby further tensioning the counterbalancing spring.

5. The roller shade of claim 4, wherein during operation of the roller shade, rotation of the motor output shaft to roll up the shade material causes rotation of the second end of the counterbalancing spring in a second direction, opposite to the first direction, with respect to the first end of the spring, thereby releasing the tension in the counterbalancing spring.

6. The roller shade of claim 2, wherein the counterbalancing spring is pretensioned by a predetermined number of pretension turns.

7. The roller shade of claim 6, wherein the motor drive unit comprises a motor control module adapted to store the predetermined number of pretension turns in a memory.

8. The roller shade of claim 7, wherein the motor control module is adapted to enter into a pretensioning mode adapted to direct the motor to rotate the motor output shaft until the counterbalancing spring reaches the predetermined number of pretension turns.

9. The roller shade of claim 6, wherein the predetermined number of pretension turns is determined based on at least one selected from the group consisting of a diameter or radius of the roller tube, a diameter or radius of the shade material wrapped about the roller tube, a thickness of the shade material, a width of the shade material, a length of the shade material, a number of layers of the shade material wrapped about the roller tube, a weight of the shade material, a weight of a hem bar attached to the shade material, and any combinations thereof.

10. The roller shade of claim 1, wherein the counterbalancing spring comprises a torsion spring.

11. The roller shade of claim 1, wherein the motor drive unit further comprises one or more planetary gears.

12. The roller shade of claim 1, wherein the motor drive unit further comprises a clutch comprising an input stage and an output stage, wherein the clutch is adapted to translate rotational motion from the input stage to the output stage and lock rotational motion from the output stage to the input stage, wherein the input stage is operably connected to the motor output shaft, and wherein the output stage is operably connected to the output mandrel.

13. The roller shade of claim 12, wherein the counterbalancing spring is adapted to be pretensioned by the motor while the motor drive unit is located outside the roller tube, and wherein the clutch is adapted to lock the pretension in the counterbalancing spring.

14. The roller shade of claim 1, wherein the output mandrel extends from a first end of the output mandrel located within the motor housing, out of an opening in the motor housing, and to a second end of the output mandrel located outside the motor housing and connected to the drive wheel.

15. The roller shade of claim 1, wherein the drive wheel comprises the second spring carrier and wherein the drive wheel comprises a bore shaped to mate with an external surface of the output mandrel such that rotation of the output mandrel causes rotation of the drive wheel while allowing the drive wheel to longitudinally travel along the output mandrel.

16. The roller shade of claim 1, wherein the second spring carrier comprises a bore shaped to mate with an external surface of the output mandrel such that rotation of the output mandrel causes rotation of the second spring carrier while allowing the second spring carrier to longitudinally travel along the output mandrel.

17. The roller shade of claim 16, wherein the drive wheel is connected to a terminal end of the output mandrel such that it does not longitudinally translate with respect to the output mandrel.

18. The roller shade of claim 1, wherein the output mandrel comprises a first mandrel portion and a second mandrel portion, wherein the first mandrel portion is operably connected to the motor output shaft and wherein the second mandrel portion is operably connected to the drive wheel.

19. A roller shade comprising:

a roller tube; and a motor drive unit at least partially disposed within the roller tube, wherein the motor drive unit comprises:

a motor adapted to drive a motor output shaft;

a clutch operably connected to the motor output shaft;

an output mandrel operably connected to the clutch;

a motor housing longitudinally extending from a first end to a second end and adapted to house the motor therein and comprising a first spring carrier adapted to be stationary during operation of the motor;

a crown adapter wheel rotatably connected to the first end of the motor housing and operably connected to the roller tube;

an idle crown wheel rotatably connected to the second end of the motor housing and operably connected to the roller tube;

a drive wheel operably connected to the output mandrel and the roller tube;

a second spring carrier operably connected to the output mandrel;

a pretensioned counterbalancing spring longitudinally extending from a first end connected to the first spring carrier and to a second end connected to the second spring carrier;

wherein during operation of the motor, rotation of the motor output shaft causes rotation of the output mandrel and thereby the drive wheel, the second spring carrier, and the roller tube, and wherein as the motor output shaft rotates, the motor, the first spring carrier, and the motor housing remain stationary while the crown adapter wheel, the idle crown wheel, and the roller tube rotate about the motor housing;

wherein the counterbalancing spring is adapted to be pretensioned by the motor while the motor drive unit is located outside the roller tube by rotation of the motor output shaft, which causes rotation of the drive wheel and thereby rotation the second end of the counterbalancing spring with respect to the first end of the spring;

wherein the clutch is adapted to translate rotational motion from the motor output shaft to the drive wheel and lock rotational motion from the drive wheel thereby locking the pretension in the counterbalancing spring.

20. A motor drive unit at least partially disposed within a roller tube of a roller shade, wherein the motor drive unit comprises:

a motor adapted to drive a motor output shaft;

a motor housing longitudinally extending from a first end to a second end and adapted to house the motor therein and comprising a first spring carrier adapted to be stationary during operation of the motor;

a crown adapter wheel rotatably connected to the first end of the motor housing and operably connected to the roller tube;

an idle crown wheel rotatably connected to the second end of the motor housing and operably connected to the roller tube;

a drive wheel operably connected to the motor output shaft and the roller tube;

a second spring carrier operably connected to the motor output shaft;

a pretensioned counterbalancing spring longitudinally extending from a first end connected to the first spring carrier to a second end connected to the second spring carrier;

wherein during operation of the motor, rotation of the motor output shaft causes rotation of the second spring carrier, the drive wheel, and the roller tube, and as the motor output shaft rotates, the motor and the motor housing remain stationary while the crown adapter wheel, the idle crown wheel, and the roller tube rotate about the motor housing; and wherein the counterbalancing spring is adapted to be pretensioned by the motor while the motor drive unit is located outside the roller tube by rotation of the drive wheel which causes rotation of the second end of the counterbalancing spring with respect to the first end of the counterbalancing spring.

21. A roller shade comprising:

a roller tube;

a shade material attached to the roller tube; and a motor drive unit at least partially disposed within the roller tube, wherein the motor drive unit comprises:

a motor adapted to drive a motor output shaft;

an output mandrel operably connected to the motor output shaft;

a motor housing longitudinally extending from a first end to a second end and adapted to house the motor therein;

a crown adapter wheel rotatably connected to the first end of the motor housing and operably connected to the roller tube;

an idle crown wheel rotatably connected to the second end of the motor housing and operably connected to the roller tube;

a stationary spring carrier;

a drive wheel operably connected to the output mandrel and the roller tube;

a rotating spring carrier operably connected to the output mandrel;

a counterbalancing spring longitudinally extending from a first end connected to the stationary spring carrier to a second end connected to the rotating spring carrier;

wherein during operation of the motor, rotation of the motor output shaft causes rotation of the output mandrel and thereby the drive wheel, the rotating spring carrier, and the roller tube, and wherein as the motor output shaft rotates, the motor, the stationary spring carrier, and the motor housing remain stationary while the crown adapter wheel, the idle crown wheel, and the roller tube rotate about the motor housing.

* * * * *